(12) United States Patent
Tamura et al.

(10) Patent No.: US 8,942,477 B2
(45) Date of Patent: Jan. 27, 2015

(54) IMAGE PROCESSING APPARATUS, IMAGE PROCESSING METHOD, AND PROGRAM

(75) Inventors: Nobuhiko Tamura, Tokyo (JP); Takayuki Hara, Yokohama (JP); Yuji Sakaegi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 189 days.

(21) Appl. No.: 13/809,559

(22) PCT Filed: Jul. 5, 2011

(86) PCT No.: PCT/JP2011/003826
§ 371 (c)(1),
(2), (4) Date: Jan. 10, 2013

(87) PCT Pub. No.: WO2012/008116
PCT Pub. Date: Jan. 19, 2012

(65) Prior Publication Data
US 2013/0114897 A1    May 9, 2013

(30) Foreign Application Priority Data
Jul. 12, 2010  (JP) ................................. 2010-158131

(51) Int. Cl.
| | |
|---|---|
| G06K 9/00 | (2006.01) |
| G06T 5/40 | (2006.01) |
| H04N 1/409 | (2006.01) |
| H04N 5/217 | (2011.01) |
| H04N 5/232 | (2006.01) |
| G06T 5/00 | (2006.01) |

(52) U.S. Cl.
CPC  *G06T 5/40* (2013.01); *H04N 1/409* (2013.01); *H04N 1/4092* (2013.01); *H04N 5/217* (2013.01); *H04N 5/23229* (2013.01); *G06T 5/002* (2013.01); *H04N 2201/0084* (2013.01)

USPC .......................................... 382/169

(58) Field of Classification Search
CPC .................. H04N 5/2354; G06T 2207/20012; G06T 5/008; G06T 5/20; G06T 5/40; G06T 5/00
See application file for complete search history.

(56) References Cited

U.S. PATENT DOCUMENTS

| | | | | |
|---|---|---|---|---|
| 6,097,849 | A  * | 8/2000 | Nevis ............................. | 382/274 |
| 6,215,914 | B1 * | 4/2001 | Nakamura et al. ............ | 382/284 |
| 6,993,167 | B1 * | 1/2006 | Skladnev et al. ............. | 382/128 |
| 2005/0078857 | A1 * | 4/2005 | Park .............................. | 382/128 |
| 2005/0171409 | A1 * | 8/2005 | Arimura et al. ............... | 600/300 |
| 2006/0038146 | A1 * | 2/2006 | Arakawa ....................... | 250/586 |
| 2007/0230788 | A1 * | 10/2007 | Lei ................................ | 382/186 |
| 2008/0050030 | A1 * | 2/2008 | Hara ............................. | 382/254 |
| 2008/0285877 | A1 * | 11/2008 | Kwak et al. .................. | 382/254 |
| 2010/0309308 | A1 * | 12/2010 | Saphier et al. ................. | 348/92 |
| 2011/0109767 | A1 * | 5/2011 | Matsunaga ................ | 348/223.1 |
| 2012/0242734 | A1 * | 9/2012 | Kakutani et al. ................ | 347/15 |

FOREIGN PATENT DOCUMENTS

| | | |
|---|---|---|
| JP | 61-156482 A | 7/1986 |
| JP | 2006-310999 A | 11/2006 |
| JP | 2010-170326 A | 8/2010 |

* cited by examiner

*Primary Examiner* — Jingge Wu
(74) *Attorney, Agent, or Firm* — Canon USA, Inc. IP Division

(57) ABSTRACT

An image processing method includes inputting input image data captured by an imaging unit, generating an input histogram of the input image data based on the input image data, and correcting the input image data based on noise characteristics data and the input histogram, wherein the noise characteristics data includes data indicating probability of a first characteristic value becoming a second characteristic value due to noise.

13 Claims, 23 Drawing Sheets

Fig. 4A

| CENTER PIXEL VALUE (IDEAL VALUE) / PIXEL VALUE (ACTUAL VALUE) | .... | 56 | 57 | 58 | 59 | .... |
|---|---|---|---|---|---|---|
| ⋮ | | | | | | |
| 56 | | 0.12 | 0.08 | 0.05 | 0.02 | |
| 57 | | 0.07 | 0.11 | 0.09 | 0.04 | |
| 58 | | 0.06 | 0.08 | 0.10 | 0.07 | |
| 59 | | 0.03 | 0.04 | 0.09 | 0.09 | |
| ⋮ | | | | | | |

↑ HISTOGRAM OF FLAT IMAGE WHOSE ORIGINAL PIXEL VALUE IS 58 IN WHICH NOISE IS GENERATED

Fig. 4B

| X \ Y | ... | 28 | 29 | 30 | 31 | 32 | 33 | ... |
|---|---|---|---|---|---|---|---|---|
| ⋮ | 0.00 | 0.00 | 0.00 | 0.00 | 0.00 | 0.00 | 0.00 | 0.00 |
| 42 | 0.00 | 0.008 | 0.011 | 0.013 | 0.011 | 0.008 | 0.004 | 0.00 |
| 43 | 0.00 | 0.015 | 0.021 | 0.024 | 0.021 | 0.015 | 0.008 | 0.00 |
| 44 | 0.00 | 0.021 | 0.031 | 0.035 | 0.031 | 0.021 | 0.011 | 0.00 |
| 45 | 0.00 | 0.024 | 0.035 | 0.040 | 0.035 | 0.024 | 0.013 | 0.00 |
| 46 | 0.00 | 0.021 | 0.031 | 0.035 | 0.031 | 0.021 | 0.011 | 0.00 |
| 48 | 0.00 | 0.015 | 0.021 | 0.024 | 0.021 | 0.015 | 0.008 | 0.00 |
| 49 | 0.00 | 0.008 | 0.011 | 0.013 | 0.011 | 0.008 | 0.004 | 0.00 |
| 50 | 0.00 | 0.003 | 0.005 | 0.005 | 0.005 | 0.003 | 0.002 | 0.00 |
| ⋮ | 0.00 | 0.00 | 0.00 | 0.00 | 0.00 | 0.00 | 0.00 | 0.00 |

Fig. 7B

| x' | x |
|---|---|
| . | . |
| . | . |
| . | . |
| 87 | 86.2 |
| 88 | 87.3 |
| 89 | 88.6 |
| 90 | 89.8 |
| 91 | 91.0 |
| 92 | 90.5 |
| . | . |
| . | . |
| . | . |

Fig. 7C

| (x',y') | (x,y) |
|---|---|
| . | . |
| (90,87) | (90,87) |
| (90,88) | (92,87) |
| (90,89) | (90,88) |
| (90,90) | (89,91) |
| (90,91) | (90,90) |
| . | . |
| (152,90) | (152,90) |
| (152,91) | (151,90) |
| (152,92) | (151,92) |
| (152,93) | (151,93) |
| (152,94) | (152,93) |
| . | . |

Fig. 8A

| PIXEL VALUE \ CENTER PIXEL VALUE | 0 | ... | 88 | 89 | 90 | 91 | 92 | 93 | 94 | 95 | ... |
|---|---|---|---|---|---|---|---|---|---|---|---|
| .. | .. | .. | .. | .. | .. | .. | .. | .. | .. | .. | .. |
| 90 | 0.00 | 0.00 | 0.10 | 0.30 | 0.70 | 0.30 | 0.30 | 0.20 | 0.10 | 0.00 | 0.00 |
| .. | .. | .. | .. | .. | .. | .. | .. | .. | .. | .. | .. |

Fig. 8B

| PIXEL VALUE / CENTER PIXEL VALUE | 0 | ... | 88 | 89 | 90 | 91 | 92 | 93 | 94 | 95 | ... |
|---|---|---|---|---|---|---|---|---|---|---|---|
| .. | .. | .. | .. | .. | .. | .. | .. | .. | .. | .. | .. |
| 90 | 0.00 | 0.00 | 0.05 | 0.15 | 0.35 | 0.15 | 0.15 | 0.10 | 0.05 | 0.00 | 0.00 |
| .. | .. | .. | .. | .. | .. | .. | .. | .. | .. | .. | .. |

US 8,942,477 B2

IMAGE PROCESSING APPARATUS, IMAGE PROCESSING METHOD, AND PROGRAM

TECHNICAL FIELD

The present invention relates to noise reduction.

BACKGROUND ART

In general, an image captured by an imaging apparatus such as a digital camera or a scanner contains noise. If noise is generated in an object image, quality of the captured image may become degraded.

Conventionally, there has been various noise reduction methods that are mainly based on processing performed using a smoothing filter.

In the object image, intensity of a high-frequency component is generally weaker as compared to that of a low-frequency component, so that noise becomes dominant in a high-frequency region in the image. In such a case, if the smoothing filter which reduces the high-frequency component is applied to the image, the noise can be reduced while maintaining the low to middle-frequency components in the object image.

Further, Japanese Patent Application Laid-Open No. 2006-310999 discusses correcting the high-frequency component in the captured image to become similar to noise, and acquiring an estimate noise image. The noise is then reduced by subtracting the estimate noise image from the captured image. The estimate noise image is acquired by performing correction in which a histogram of pixel values of the high-frequency component in the captured image is caused to become closer to the histogram of the noise in the imaging apparatus.

The above-described noise reduction technique using the smoothing filter reduces the noise and also the high-frequency component in the object image. As a result, a fine texture component of the object image may also become removed.

Further, whether a target pixel is an edge of the object or noise cannot be determined based only on the individual pixel values in the captured image. An edge component of the object image thus becomes included in the estimate noise image according to the technique discussed in Japanese Patent Application Laid-Open No. 2006-310999. As a result, the technique discussed in Japanese Patent Application Laid-Open No. 2006-310999 subtracts the estimate noise image including the edge component from the captured image, so that the edge of the image after performing noise reduction may become blurred.

SUMMARY OF INVENTION

According to an aspect of the present invention, an image processing apparatus includes an input unit configured to receive input image data captured by an imaging unit, a first generation unit configured to generate an input histogram of the input image data based on the input image data, and a correction unit configured to change a characteristic value of the input image data to a statistical value of an overlapped region of (a) a distribution of the input histogram and (b) a distribution of noise characteristics data corresponding to the characteristic value.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 4A illustrates a noise characteristics table according to the first exemplary embodiment.

FIG. 4B illustrates a noise characteristics table according to the second exemplary embodiment.

FIG. 7B illustrates an LUT according to the first exemplary embodiment.

FIG. 7C illustrates an LUT according to the second exemplary embodiment.

FIG. 8A illustrates a row corresponding to pixel value 90 in the noise characteristic table illustrated in FIG. 4A.

FIG. 8B illustrates a row corresponding to pixel value 90 in the noise characteristic table illustrated in FIG. 4A after normalization.

DESCRIPTION OF EMBODIMENTS

Various exemplary embodiments, features, and aspects of the invention will be described in detail below with reference to the drawings.

Figure 1:
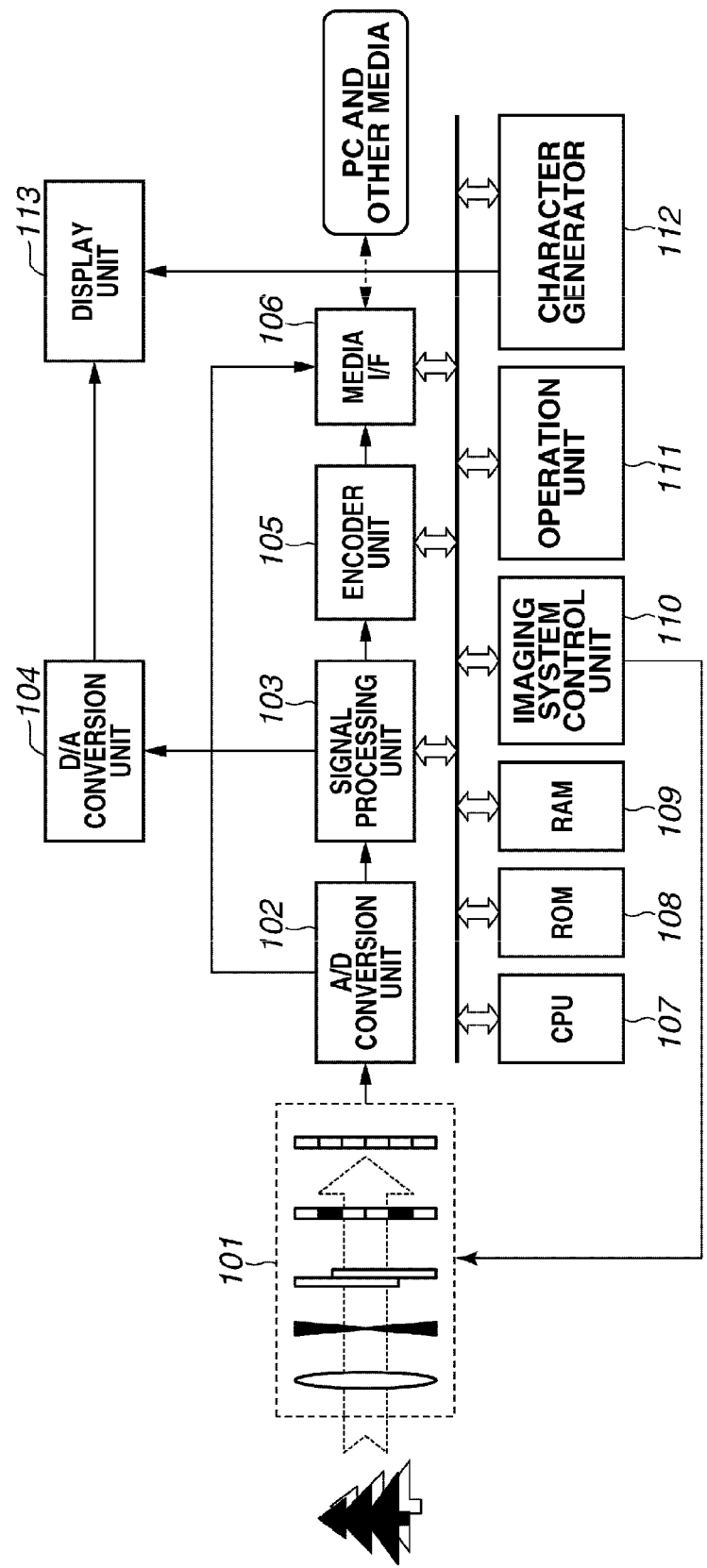
FIG. 1 illustrates a configuration of an image processing apparatus according to a first exemplary embodiment of the present invention.

FIG. 1 illustrates a configuration of the image processing apparatus according to the first exemplary embodiment of the present invention.

Referring to FIG. 1, an imaging unit 101 includes a zoom lens, a focus lens, a blur correction lens, a diaphragm, a shutter, an optical low-pass filter (LPF), an infrared ray (IR) cut filter, a color filter, and a sensor such as a complementary metal-oxide semi-conductor (CMOS) or a charge-coupled device (CCD). The imaging unit 101 detects an amount of incident light entering from the object.

An analog/digital (A/D) conversion unit 102 converts to a digital value the amount of incident light received from the object that is detected by the sensor.

A signal processing unit 103 performs noise reduction, white balance processing, edge enhancement, color conversion, and gamma processing with respect to the digital value, and generates digital image data.

A D/A conversion unit 104 performs analog conversion of the digital image data and outputs the resulting data to a display unit 113.

An encoder unit 105 converts the digital image data to image data of a file format such as joint photographic experts group (JPEG) and moving picture experts group (MPEG).

A media interface (I/F) 106 is an interface for connecting to a personal computer (PC) and other media (e.g., a hard disk, a memory card, a compact flash (CF) card, a secure digital (SD) card, or a universal serial bus (USB) memory). A central processing unit (CPU) 107 performs processing of various components in the image processing apparatus. The CPU 107 sequentially reads commands stored in a read-only memory (ROM) 108 or a random access memory (RAM) 109, and performs various processes according to the present exemplary embodiment. Further, the ROM 108 and the RAM 109 provides to the CPU 107 programs, data, and a work area that are necessary for performing the processes.

An imaging system control unit 110 controls the imaging unit 101 according to an instruction from the CPU 107, such as performing focusing, opening and closing of the shutter, and diaphragm adjustment.

An operation unit 111 includes a touch panel, buttons, and a mode dial, and receives user instruction input using such components.

A character generator 112 generates characters and graphics to be displayed.

The display unit 113, which is generally a liquid display, displays the image, characters, and graphics indicated by the image data received from the character generator 112 and the D/A conversion unit 111. The display unit 113 may include a touch screen function, and in such a case, the user instruction may be recognized as an input to the operation unit 111.

The apparatus according to the present exemplary embodiment is not limited to the image processing apparatus. For example, the computer may acquire via a network or media, digital image data captured using an imaging apparatus such as the digital camera, and an application in the computer may perform the series of processes according to the present exemplary embodiment.

Figure 2:
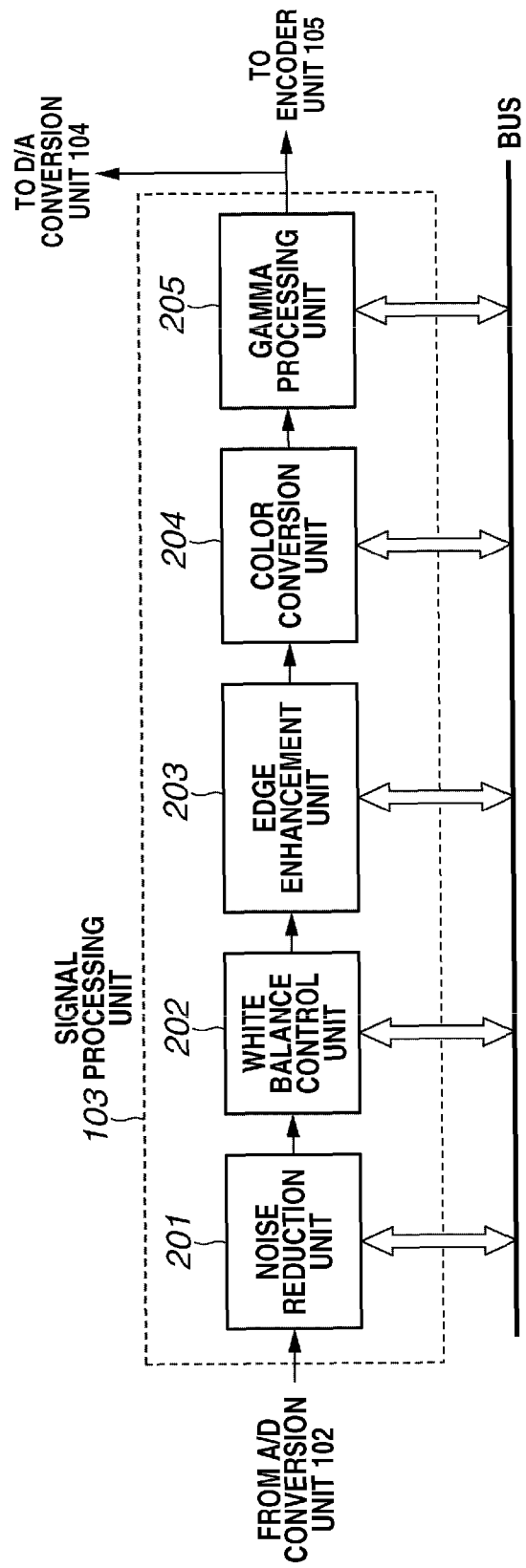
FIG. 2 illustrates a signal processing unit according to the first exemplary embodiment.

According to the present exemplary embodiment, the signal processing unit 103 performs the noise reduction process. FIG. 2 illustrates the detail of the signal processing unit 103. The signal processing unit 103 illustrated in FIG. 2 performs various processes on the image data to improve the image quality.

Referring to FIG. 2, a noise reduction unit 201 performs noise reduction to be described below. A white balance control unit 202 adjusts the white balance with respect to the image indicated by the image data on which noise reduction has been performed. An edge enhancement unit 203 then performs edge enhancement for improving sharpness of the image indicated by the image data. A color conversion unit 204 performs color conversion for improving color reproducibility, and a gamma processing unit 205 performs gamma processing on the image data. A result of such series of processes performed by the signal processing unit 103 is then transmitted to the D/A conversion unit 104 and the encoder unit 105. It is not necessary for the noise reduction unit 201 to perform the noise reduction prior to the process performed by the white balance control unit 202. In other words, the noise reduction may be performed after the color conversion unit 204 performs the color conversion process, or the gamma processing unit 205 performs the gamma processing.

(Noise Reduction Method Using One-Dimensional Histogram)

A noise reduction method using a one-dimensional histogram will be described below for describing the noise reduction method using a multidimensional histogram.

Figure 3A:
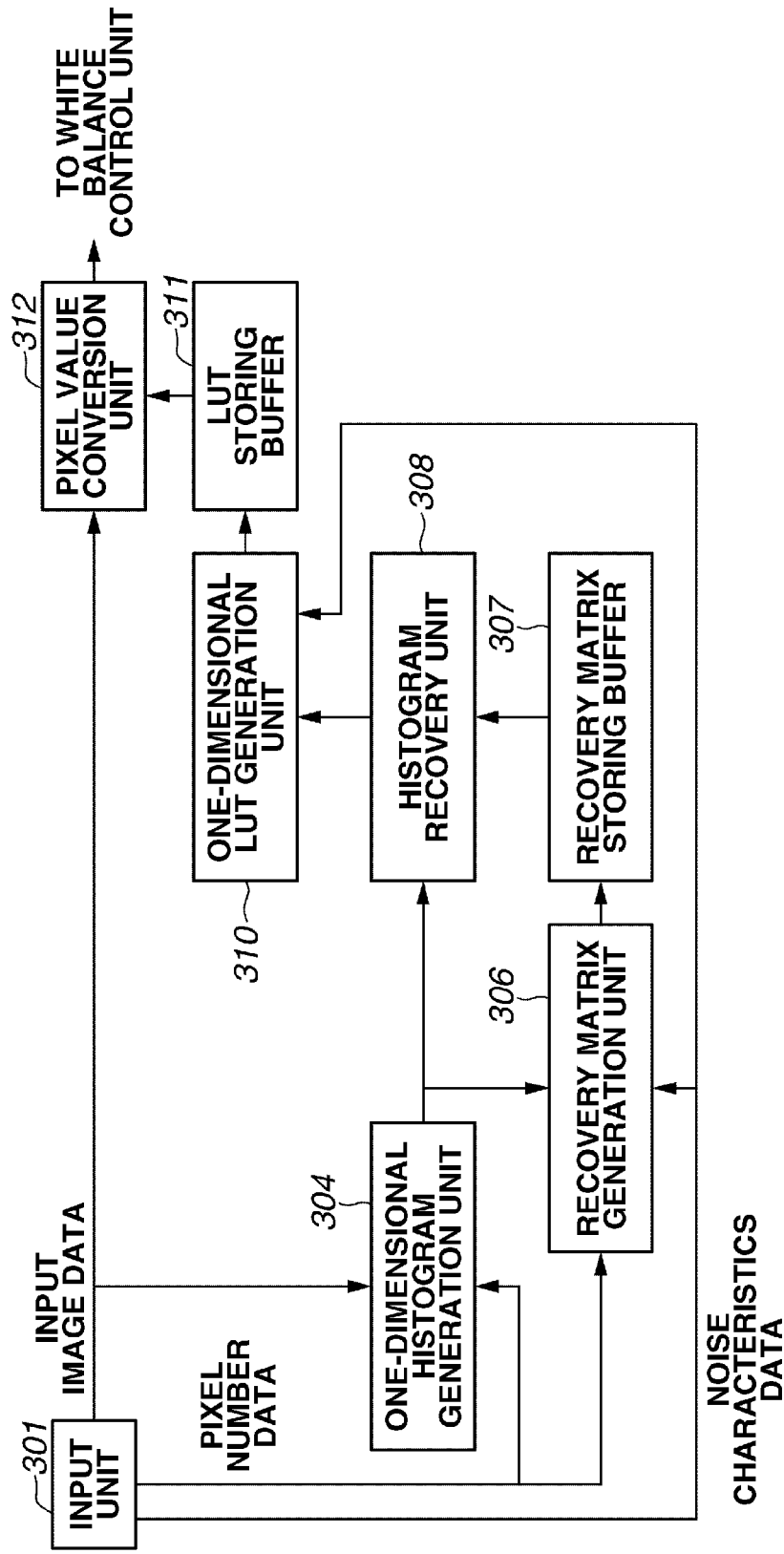
FIG. 3A illustrates a configuration for performing noise reduction according to the first exemplary embodiment.

FIG. 3A is a block diagram illustrating a configuration which is necessary for performing the noise reduction method using the one-dimensional histogram. The operation of each block illustrated in FIG. 3A will be described below. An input unit 301 acquires from the ROM 108 or the RAM 109, a total number of pixels and noise characteristics data of the input image indicated by the input image data. The total number of pixels of the input image may be acquired by analyzing the input image data that is input.

FIG. 4A illustrates an example of the noise characteristics data (or the noise characteristics table) stored in the ROM 108 or the RAM 109.

The noise characteristics table illustrated in FIG. 4A is a table indicating a probability histogram of a pixel value (i.e., an ideal value) input to the image processing apparatus becoming converted to a digital value (i.e., an actual value) by an effect of noise.

Referring to the example illustrated in FIG. 4A, when the input pixel value is 58, pixel values of 10% (0.10) of the pixels in the image become 58. On the contrary, the pixel values of 5% of the pixels become 56, 9% become 57, and 9% become 59.

Figure 24:
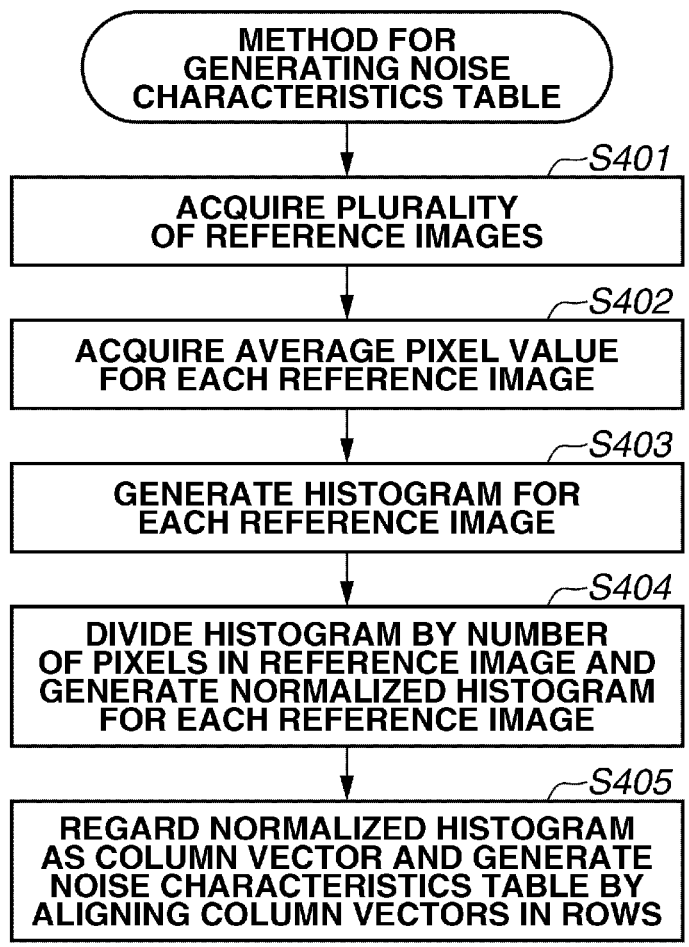
FIG. 24 is a flowchart illustrating a method for generating the noise characteristics table.

The method for generating the noise characteristics table illustrated in FIG. 4A will be described below. FIG. 24 is a flowchart illustrating a process performed for generating the noise characteristics table.

In step S401, the image of the object having proximately uniform brightness is captured by changing an exposure amount, and a plurality of images (i.e., reference images), each corresponding to an exposure amount, is acquired. In step S402, an average pixel value of each of the reference images is then acquired. The average pixel value is regarded as a center pixel value. The average pixel value (the center pixel value) may be a mode value of the pixel value of each of the reference images.

In step S403, a histogram illustrating a relationship between an appearance frequencies of the pixel values in the reference image and the average pixel value for each reference image is generated. In step S404, a normalized noise histogram is then generated by dividing each noise histogram by the total number of pixels in the reference image. The normalized noise histogram corresponding to the reference image whose center pixel value is M is referred to as $H_M$.

In step S405, the normalized noise histogram $H_M$ is expressed as a column vector, and the noise characteristic table illustrated in FIG. 4 is acquired by arranging in a row, the column vectors from a column vector $H_0$ to a column vector $H_{Mmax}$ (Mmax is a maximum value of a pixel value achieved in the image processing apparatus). Each element in the noise characteristics table (acquired by dividing a number of pixels of each pixel value in the image by the total number of pixels N) is referred to as a normalized pixel frequency. A noise characteristic in which the effect of a resolution characteristic of the imaging optical system is reduced can be acquired by capturing the object having proximately uniform brightness. Further, if there is a light falloff at edges of the lens, the noise characteristic may be calculated in a small region in the image.

Each element in the noise characteristics table may be a number of pixels having each pixel value in the image, instead of the normalized pixel frequency.

Further, the noise characteristic table may be acquired as follows. The normalized noise histogram $H_M$ with respect to a representative center pixel value M is acquired. The normalized noise histograms $H_M$ with respect to the remaining center pixel values M are then calculated by performing interpolation on the acquired normalized noise histogram $H_M$.

Furthermore, the noise characteristics data is generated in a table format as illustrated in FIG. 4A. However, this is not a limitation, as long as a probability histogram of the actual value with respect to the input ideal value in the image processing apparatus can be generated. For example, the noise characteristic data may be generated using a function, and the probability histogram with respect to the input ideal value may be sequentially generated.

Moreover, the noise characteristics data may be generated from images acquired by photographing a chart having a plurality of regions of different reflectivity. In such a case, the normalized noise histogram $H_M$ with respect to the center pixel value M is acquired for each region, so that the noise characteristic data can be generated by a smaller number of photographing.

The noise characteristics data may be described in a format other than the table. For example, the pixel value (i.e., the actual value) may be calculated by storing a standard deviation for each center pixel value (i.e., the ideal value).

Figure 5A:
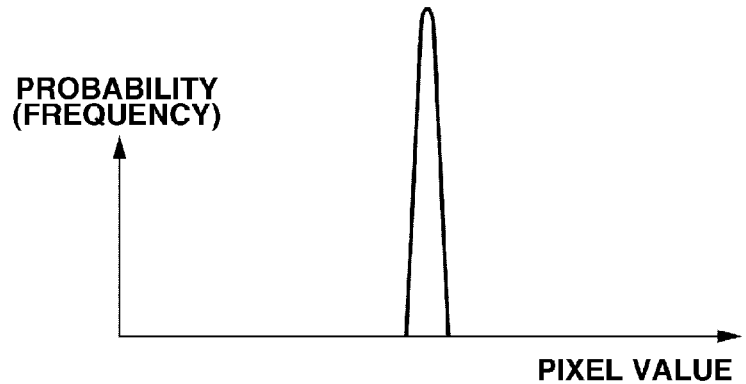
FIG. 5A is a schematic diagram illustrating a relation between noise and a one-dimensional histogram of the image.
Figure 5B:
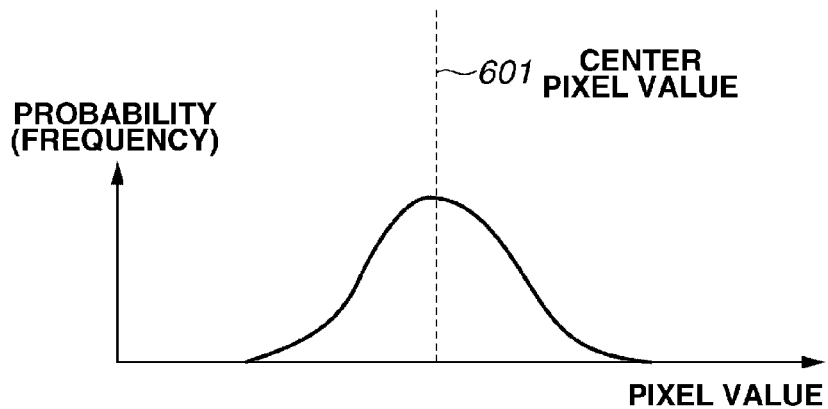
FIG. 5B is a schematic diagram illustrating a relation between noise and a one-dimensional histogram of the image.

FIGS. 5A and 5B illustrate distributions in the normalized noise histograms of the pixel values in the image processing apparatus.

If there is little noise when capturing the image of the object having proximately uniform brightness, there is small dispersion in the acquired normalized noise histogram of the pixel values as illustrated in FIG. 5A. On the other hand, if the noise is generated in the image, the acquired normalized noise histogram of the pixel values becomes greatly dispersed as illustrated in FIG. 5B. The actual image which is usually acquired becomes as illustrated in FIG. 5B.

It is thus assumed that the pixel values (actual values) are distributed to spread around a center pixel value 601 illustrated in FIG. 5B, due to the noise being generated in the pixel corresponding to the center pixel value 601 that is input to the image processing apparatus. As described above, the noise characteristic becomes different depending on the brightness, so that the images are captured at various levels of brightness, and a plurality of normalized noise histograms with respect to a plurality of center pixel values is acquired. The noise characteristics table illustrated in FIG. 4A is then generated by aligning the acquired normalized noise histograms.

The noise characteristics table illustrated in FIG. 4A can also be generated as follows. An image captured using a camera in which a small amount of noise is generated (i.e., a reference camera) is regarded as an image without noise. In such a case, it is not necessary to capture an image of an object whose brightness is proximately uniform. For example, an object which is fixed indoors may be captured. The object which has been captured using the reference camera is then captured using a camera in which the noise is to be reduced (i.e., a target camera). The average value of the image data acquired by the reference camera is thus set as the center pixel value and is regarded as the average pixel value (center value) described in step S402 illustrated in FIG. 24. Further, the image data acquired by the target camera is regarded as one of the reference images described in step S401 illustrated in FIG. 24. Such a process is performed a plurality of times while changing the exposure amounts of the reference camera and the target camera, so that a plurality of center pixel values and reference images are acquired. The subsequent process is similar to the above-described method for generating the noise characteristics table.

Furthermore, the noise characteristics table illustrated in FIG. 4A can be generated using a single camera. More specifically, imaging sensitivity of the camera is adjusted, and when an image with a small amount of noise is acquired, the image of the same object is captured at the imaging sensitivity in which noise reduction becomes necessary. A difference image between the two images is then regarded as the reference image, and the noise characteristics table can be similarly generated as described above.

Moreover, the noise characteristic depends on temperature in addition to the exposure amount. The noise characteristics table illustrated in FIG. 4A can thus be generated according to temperature, so that accuracy of noise reduction is increased.

Returning to FIG. 3A, a one-dimensional histogram generation unit 304 generates the one-dimensional histogram by dividing the frequencies of the pixel values of the input image data by a total number of pixels N. The division may be performed at low calculation cost, such as by performing a bit shift. The generated one-dimensional histogram is expressed as a vector in which a number of pixels having a pixel value X in the input image data is indicated as an X-th element.

Figure 20A:
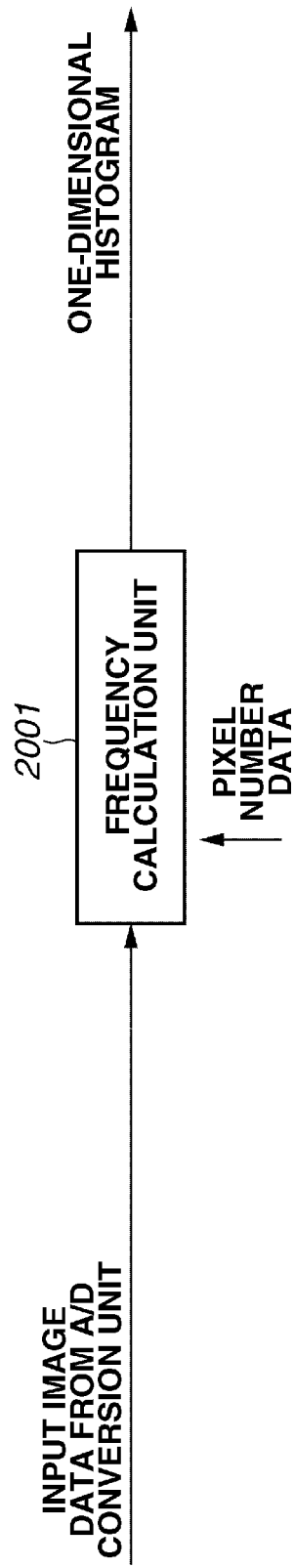
FIG. 20A is a block diagram illustrating histogram generation.

FIG. 20A illustrates in detail the one-dimensional histogram generation unit 304. Referring to FIG. 20A, a frequency calculation unit 2001 acquires the input image data from the A/D conversion unit and counts the frequency of each pixel value included in the input image data. The frequency calculation unit 2001 then divides the counted frequency by the total number of pixels in the input image data and outputs the one-dimensional histogram. The output one-dimensional histogram may be a histogram configured of the frequencies of the number of pixels of each pixel value without dividing by the total number of pixels.

A recovery matrix generation unit 306 generates a recovery matrix based on the total number of pixels in the input image data N, the noise characteristics table, and the one-dimensional histogram. The recovery matrix generation unit 306 stores the generated recovery matrix in a recovery matrix buffer 307. The method for generating the recovery matrix will be described in detail below. If the recovery matrix is applied to the one-dimensional histogram, the histogram that is dispersed due to noise generation can become close to the state in which the frequency is sharpened before noise generation. A "sharpened state" is a state in which the high-frequency component increases by performing Fourier transform (i.e., a frequency transform) on the histogram. Hereinafter, such an effect will be referred to as recovery (or histogram recovery).

Figure 6A:
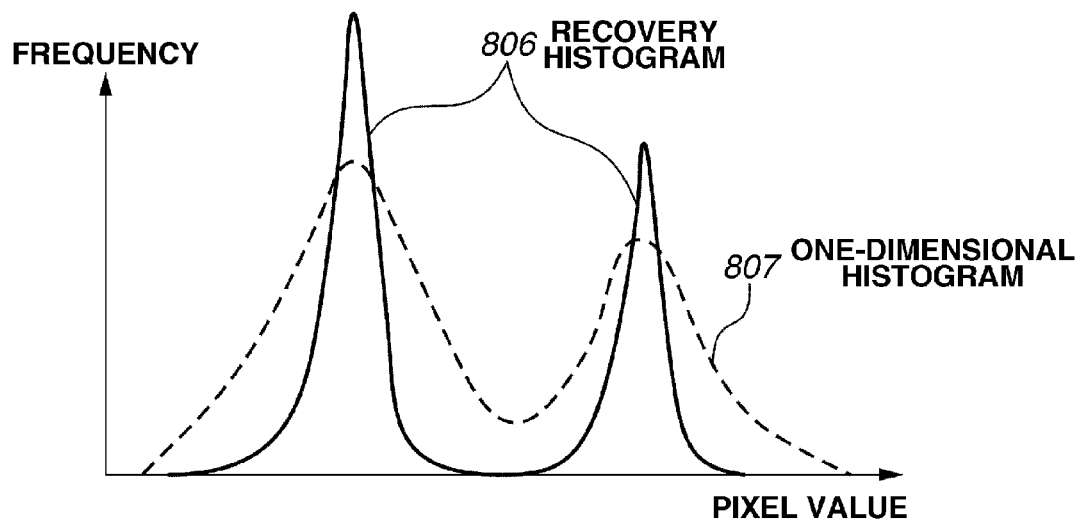
FIG. 6A is a schematic diagram illustrating histogram recovery according to the first exemplary embodiment.
Figure 6B:
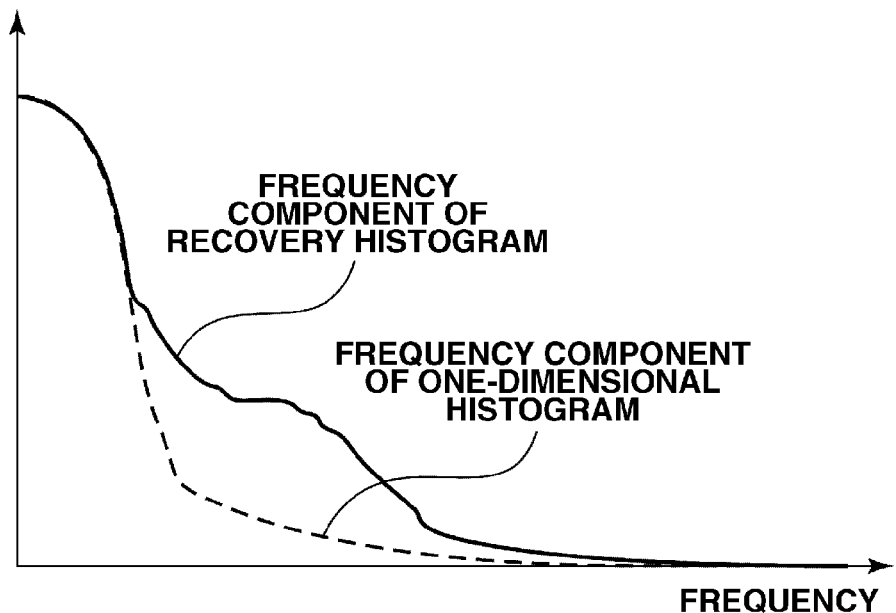
FIG. 6B is a schematic diagram illustrating histogram recovery according to the first exemplary embodiment.

A histogram recovery unit 308 then applies the recovery matrix to the one-dimensional histogram, so that a recovery histogram is calculated. FIG. 6A is a schematic diagram illustrating histogram recovery. Referring to FIG. 6A, the histogram recovery causes a one-dimensional histogram of input image data 807 to become sharper and thus become transformed to the recovery histogram. The high-frequency component of the sharpened recovery histogram is greater than the high-frequency component of the one-dimensional histogram of the input image data. FIG. 6B illustrates the frequency components of the one-dimensional histogram of the input image data and the frequency components of the sharpened recovery histogram. Referring to FIG. 6B, it is clear by focusing on the high-frequency component that the high-frequency component in the one-dimensional histogram is greater than the high-frequency component in the recovery histogram.

An LUT generation unit 310 generates the LUT from the noise characteristic data and the recovery histogram, and stores the LUT in an LUT storing buffer 311. The LUT is a table for converting the pixel value of the input image data to an estimate value of the pixel value before the noise is generated.

A method for deriving the pixel value before the noise is generated with respect to the input image data whose pixel value is 90 will be described below as an example for describing the LUT generation unit 310.

It is assumed that a pixel value before noise is generated becomes the pixel value 90 in the input image data due to noise generation. The original pixel value that has become 90 in the input image data due to noise generation is then determined. FIG. 8A illustrates the row in the noise characteristics table illustrated in FIG. 4A in which the pixel value becomes 90 after the noise is generated (i.e., the actual value becomes 90). Referring to FIG. 8A, the original pixel value having the highest probability of the pixel value becoming 90 is 90. Further, the pixel values such as 89 and 91 which are close to 90 have the probabilities of the pixel value becoming 90 after noise generation. However, the probability that the pixel value of the pixel whose original pixel value is 0 becoming 90 is 0. As described above, the probability of the pixel value that becomes 90 by noise generation can be identified by reading the noise characteristics table illustrated in FIG. 4A in a horizontal direction.

The noise characteristics table illustrated in FIG. 4A is normalized to 1 in a vertical direction. However, the table is not normalized to 1 in the horizontal direction. If the noise characteristics table illustrated in FIG. 4A is normalized in the horizontal direction, the table can be used, as a table indicating the probabilities of the original pixel values when a pixel value X' of the input image data becomes 90.

FIG. 8B illustrates a row acquired by normalizing the row in which the pixel value is 90 in the noise characteristics table illustrated in FIG. 8A. Referring to FIG. 8B, a sum of the normalized pixel value frequencies of the row in which the pixel value is 90 becomes 1.

Such a distribution of the normalized pixel frequencies in the horizontal direction illustrated in FIG. 8B is referred to as a noise variability characteristics distribution.

Further, a normalized recovery histogram 806 is acquired by similarly normalizing the recovery histogram so that the sum becomes 1.

Figure 7A:
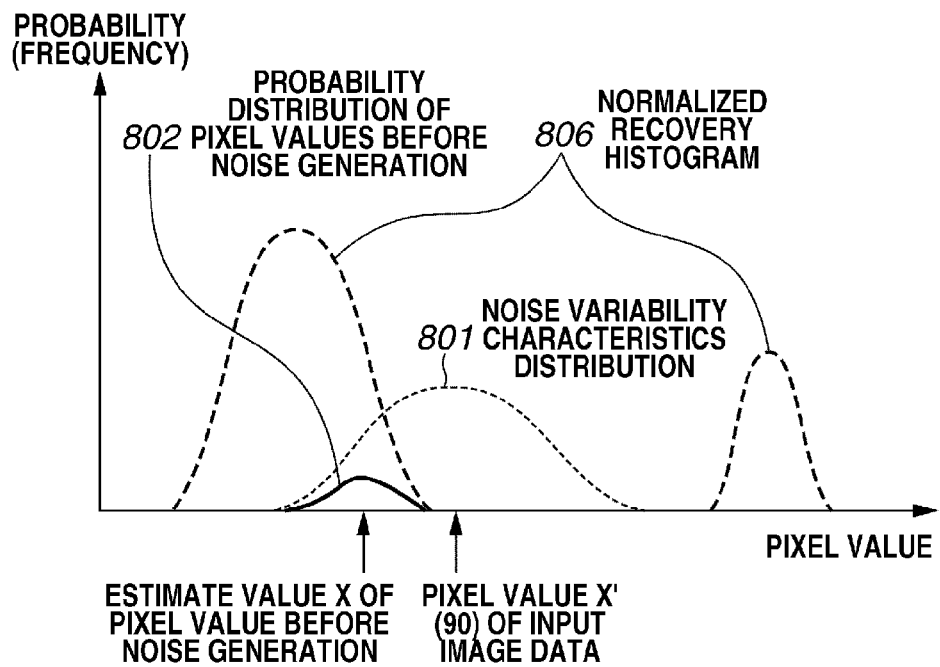
FIG. 7A illustrates a look-up table (LUT) generation method according to the first exemplary embodiment.

FIG. 7A illustrates the normalized recovery histogram 806 and a noise variability characteristics distribution 801 at the same time. It is highly possible that the original pixel value X before noise generation exists in a region in which the normalized recovery histogram and the noise variability characteristics distribution overlap. Results of multiplying the normalized recovery histogram 806 and the noise variability characteristics distribution 801 for each pixel value are thus regarded as a probability distribution of pixel values before noise generation 802. The pixel value corresponding to a weighted center position of the probability distribution of pixel values before noise generation 802 thus becomes an estimate value X of the pixel value before noise generation. The estimate value X of the pixel value before noise generation may be other statistical values, such as the center position or a mode value of the probability distribution of pixel value before noise generation 802.

The LUT generation unit 310 also performs the above-described calculation with respect to the pixel values other than 90. The LUT generation unit 310 thus generates the LUT that associates the pixel value X' in the input image data with the estimate value X of the pixel value before noise generation.

FIG. 7B illustrates an example of the LUT that indicates a relationship between the pixel value X' of the input image data and the estimate value X of the pixel value before noise generation (i.e., the ideal value X). The generated LUT is stored in the LUT storing buffer 311. The LUT may also be generated by estimating the pixel value before noise generation for only a representative pixel value and acquiring the estimate values of the other pixel values by performing interpolation.

A pixel value conversion unit 312 then acquires a processed image (a corrected image) by applying the LUT stored in the LUT storing buffer 311 to the input image data. The estimate values of the pixel values before noise generation is assigned to the pixels in the input image data by performing such a process, so that the processed image data becomes estimate image data of the image before noise generation. The noise is reduced in the processed image data as compared to the image indicated by the input image data.

The pixel value conversion unit 312 then outputs the processed image data to the other processes performed by the signal processing unit 103. The pixel value conversion unit 312 may output the estimate values by calculating the estimate value of the pixel value before noise generation for each pixel in the input image data without referring to the LUT.

By performing the above-described processes, an image in which the noise is reduced can be acquired. Since the noise is reduced by applying the LUT for each pixel value, the processing content does not change according to spatial frequency of the input image. The noise can thus be reduced regardless of the spatial frequency of the input image.

The calculation and the application methods of the recovery matrix will be described below.

A matrix D includes as the elements, the normalized pixel frequencies in the noise characteristics table illustrated in FIG. 4A that indicate the noise characteristics. An element $D_{ij}$ in the matrix D indicates a probability of the j-th pixel value before noise generation (i.e., the center pixel value illustrated in FIG. 4A) becoming an i-th pixel value due to noise generation (i.e. the pixel value illustrated in FIG. 4A). A one-dimensional histogram of the input image data is expressed in vector notation as p'(x), wherein x is a pixel value. A histogram of an image before noise generation is similarly expressed in vector notation as p(x). A relationship between the matrix D and the vectors p'(x) and p(x) is thus expressed by the following equation.

[Math. 1]

$$p'(x)=Dp(x) \quad (1)$$

According to equation (1), the histogram of the image after noise generation p'(x) (i.e., the one-dimensional histogram of the input image data) is expressed as a product of the matrix D indicating the noise, and the histogram of the image after noise generation p(x). The histogram of the image after noise generation p(x) can be derived by multiplying an inverse matrix of the matrix D, i.e., $D^{-1}$, to both sides of equation (1), as illustrated in equation 2.

[Math. 2]

$$p(x)=D^{-1}p'(x) \quad (2)$$

The vector p may not be accurately calculated depending on the characteristic of the matrix D, such as when the matrix D is not a square matrix, or is a singular matrix. In such a case, a pseudo inverse matrix Q of the matrix D is calculated, so that Qp'(x) becomes a histogram in which the vector p(x), i.e., the histogram of the image before noise generation, is approximated. The equation for acquiring the histogram of the image before noise generation using the pseudo inverse matrix Q thus becomes as follows.

[Math. 3]

$$\hat{p}=Qp'(x) \quad (3)$$

If the pseudo inverse matrix Q is then modified, and a recovery matrix R which is robust against statistical noise to be described below is calculated, Rp' which is an approximate of the histogram p before noise generation may be acquired.

Figure 23:
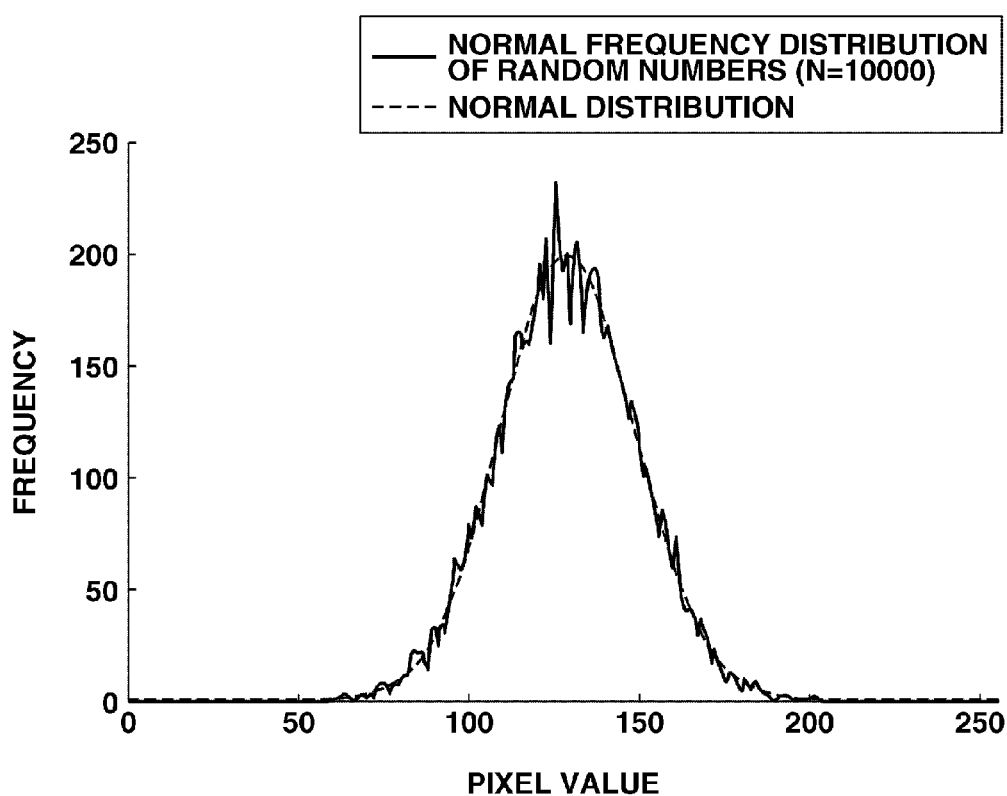
FIG. 23 illustrates statistical noise.

FIG. 23 illustrates statistical noise. Referring to FIG. 23, a solid line is a plot of a histogram acquired by generating on a calculator, random numbers whose probability distributions is a normal distribution. The histogram does not become a normal distribution as long as the generated random numbers are finite. If the number of generated random numbers is increased, the histogram becomes close to the normal distribution. Such an error generated between an ideal histogram and an actual histogram due to a finite number of samples is referred to as statistical noise. The recovery matrix R is acquired by modifying the pseudo inverse matrix in consideration of the existence of statistical noise.

Since the pseudo inverse matrix Q reduces the dispersion of the histogram due to noise, the pseudo inverse matrix Q is effective in sharpening the histogram. The statistical noise is included in the actual histogram, so that the statistical noise also becomes sharpened by simply applying the pseudo inverse matrix Q to the histogram p' of the input image data. An estimation error of the histogram before noise generation is thus increased.

To solve such a problem, when the statistical noise is large, it is desirable to reduce the level of sharpness caused by applying the pseudo inverse matrix Q. The size of the statistical noise depends on the number of samples used in generating the histogram, i.e., the total number of pixels. It is thus desirable to use the recovery matrix R in which the level of sharpness caused by applying the pseudo inverse matrix Q is adjusted according to the total number of pixels. The following equation illustrates an example of the calculation method of the recovery matrix R.

[Math.4]

$$R=a(p', N)Q+b(p', N)I \quad (4)$$

The above-described equation indicates that the recovery matrix R is a weighted average of an unit matrix I and the pseudo inverse matrix Q. Coefficients a and b are coefficients that change according to the histogram p'(x) and the total number of pixels N of the input image data. If the total number of pixels N is large, R becomes close to the pseudo inverse matrix by increasing a and decreasing b, and the recovery processing is performed. On the other hand, if the total number of pixels N is small, the estimation error due to the statistical noise is reduced by decreasing a and increasing b.

The reason the coefficients a and b depend on the histogram p'(x) in addition to the total number of pixels N will be described below. For example, if there is a range in the histogram in which the pixel values are greatly distributed (i.e., a first range), and a range in which the pixel values are less distributed (i.e., a second range), the number of samples is greater in the first range as compared to the second range. The first range is thus a range in the histogram in which there is less statistical noise. The error due to the statistical noise is thus small in the range of a greater number of pixel values, even when the value of a is increased and the value of b is decreased to approximate the recovery matrix R to the pseudo inverse matrix Q. On the other hand, the estimate error due to the statistical nose increases in the region where the number of pixel values is small. It is thus desirable to set a large value to the coefficient b and a small value to the coefficient a in the second range so that the effect of the statistical noise becomes relatively small.

The recovery process using the recovery matrix R derived by equation (4) is as illustrated in equation (5).

[Math. 5]

$$\hat{p}=Rp'(x) \quad (5)$$

(Limitation of Noise Reduction Method Using One-Dimensional Histogram)

Figure 9A:
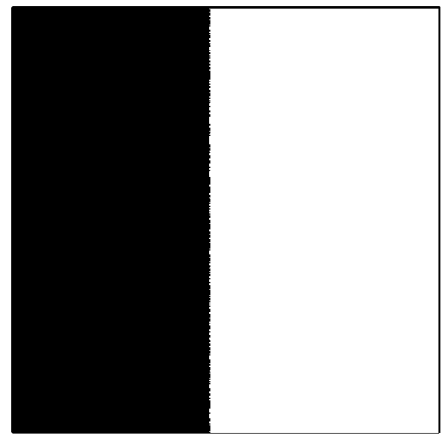
FIG. 9A illustrates a gradation image.
Figure 9B:
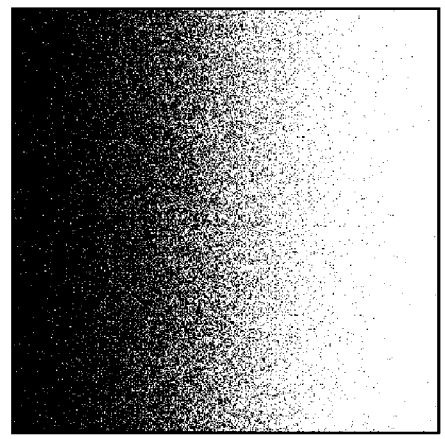
FIG. 9B illustrates the gradation image in which noise is generated.
Figure 10A:
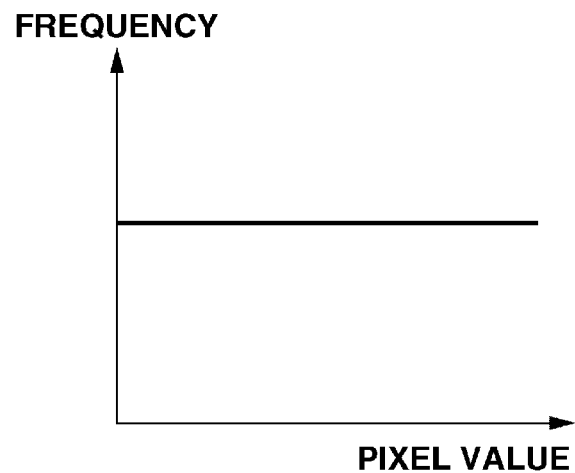
FIG. 10A illustrates a one-dimensional histogram corresponding to the image data illustrated in FIG. 9A.
Figure 10B:
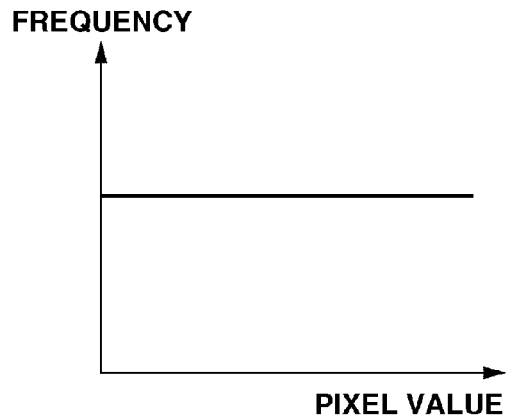
FIG. 10B illustrates a one-dimensional histogram corresponding to the image data illustrated in FIG. 9B.

There are cases where the above-described noise reduction method using the one-dimensional histogram is not sufficient in actually reducing the noise. FIGS. 9A and 9B respectively illustrate a gradation image and an image in which noise is generated in the gradation image. The histograms of the images illustrated in FIGS. 9A and 9B become flat as illustrated in FIGS. 10A and 10B. The recovery histograms of such one-dimensional histograms are also flat, so that there is little difference between the histograms before and after the recovery.

Figure 11:
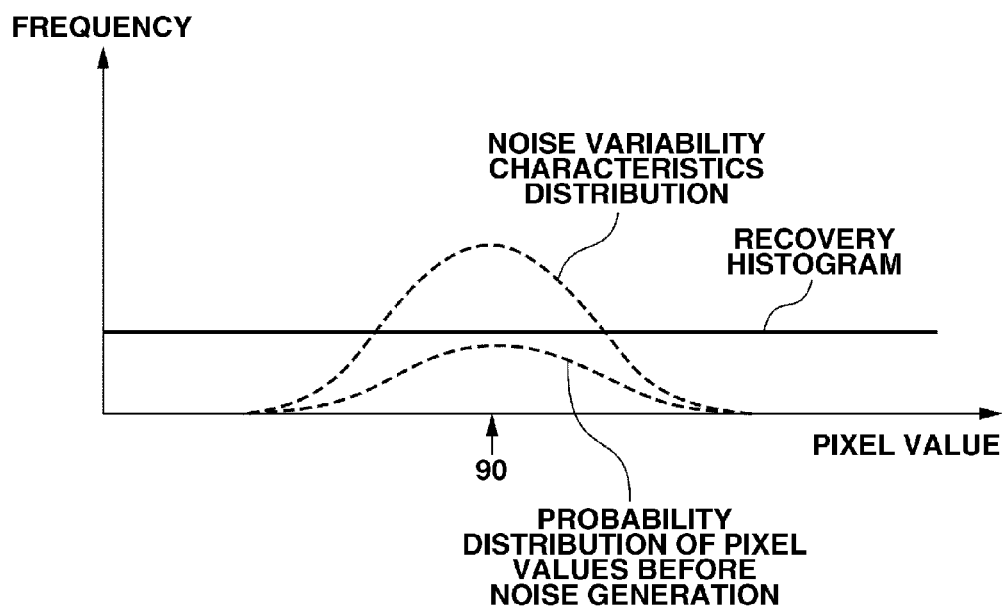
FIG. 11 illustrates the LUT generation method in a case where a gradation image is the input image.

FIG. 11 illustrates the recovery process in a case where the input image data is a gradation image as illustrated in FIGS. 10A and 10B. Referring to FIG. 11, the product of the (normalized) recovery histogram and the noise variability characteristics distribution is of a similar shape as the noise variability characteristics distribution. The pixel value indicated by the weighted center position of the probability distribution of the pixel values before noise generation then becomes the same as the pixel value of the input image data, so that noise reduction cannot be actually performed. Such a problem is caused by the noise generation phenomenon not appearing as a change in the one-dimensional histogram.

(Noise Reduction Method Using Multidimensional Histogram)

To solve the above-described problem, a noise reduction method using a multidimensional histogram will be described according to the present exemplary embodiment.

Figure 3B:
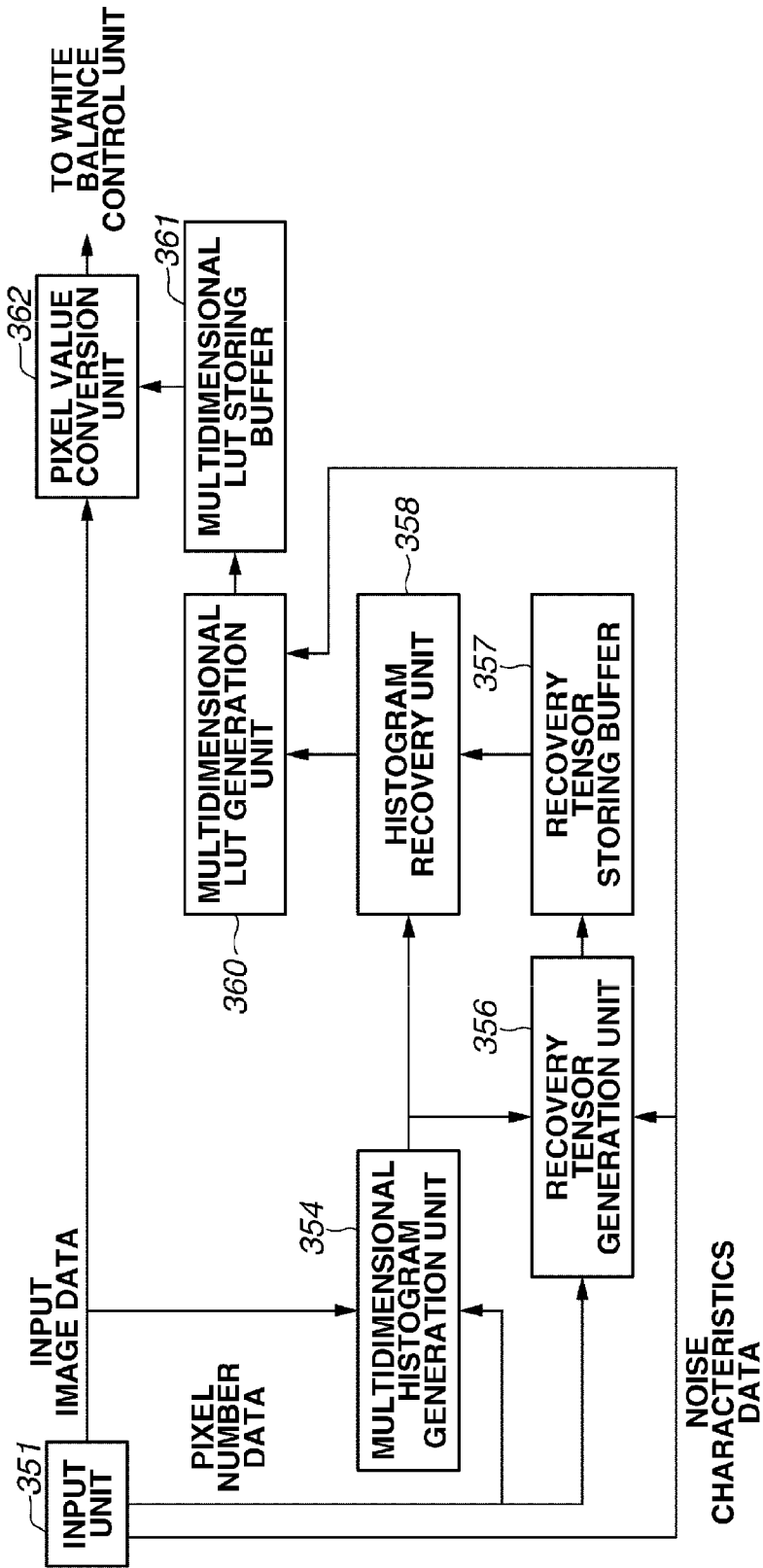
FIG. 3B illustrates a configuration for performing noise reduction according to the second exemplary embodiment.

FIG. 3B is a block diagram illustrating a configuration which is necessary for performing noise reduction using the multidimensional histogram. Since a portion of the processes illustrated in FIG. 3B is similar to that in the noise reduction process using the one-dimensional histogram illustrated in FIG. 3A, a detailed description of the overlapping portions will be omitted.

Referring to FIG. 3B, an input unit 351 acquires the input image data, the total number of pixels, and the noise characteristics data.

Figure 20B:
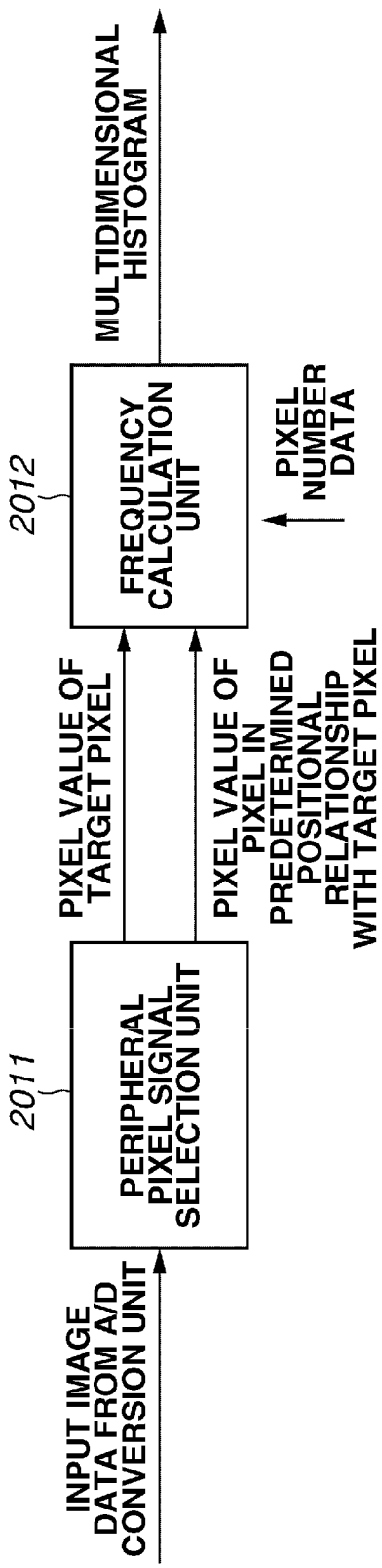
FIG. 20B is a block diagram illustrating histogram generation.

A multidimensional histogram generation unit 354 then generates the multidimensional histogram using the input image data and the total number of pixels. FIG. 20B illustrates in detail the multidimensional histogram generation unit. Referring to FIG. 20B, a peripheral pixel selection unit 2011 sequentially acquires the pixel values of the input image data from the A/D conversion unit. The peripheral pixel selection unit 2011 then outputs to a frequency calculation unit 2012, a pair of the pixel value of a target pixel and a pixel value of the pixel in a predetermined positional relationship with the target pixel. The frequency calculation unit 2012 counts the frequency of the combination and divides the frequency by the pixel value input by the input unit 351 to generate the multidimensional histogram.

According to the present exemplary embodiment, the multidimensional histogram is a frequency distribution of a plurality of pixels forming one group. In other words, the multidimensional histogram is generated based on the appearance frequency of the combination of the pixel value of each target pixel and the pixel value of the pixel in the predetermined positional relationship with the target pixel in the input image indicated by the input image data. According to the present exemplary embodiment, the pixel value in the noise reduction process using the one-dimensional histogram and/or the combination of the pixel values in the noise reduction process using the multidimensional histogram will be referred to as a characteristic value.

According to the present exemplary embodiment, the multidimensional histogram is a two-dimensional histogram, and the positional relationship indicates "a pixel to the immediate right of the target pixel". The two-dimensional histogram of the input image data counts over the entire image by scanning the input image data, the pairs in which the pixel value of the target pixel is X and the pixel value of the pixel to the immediate right of the target pixel is Y. The two-dimensional histogram is then acquired by dividing the frequency by the total number of pixels in the entire image, similarly as in the one-dimensional histogram.

Figure 12A:
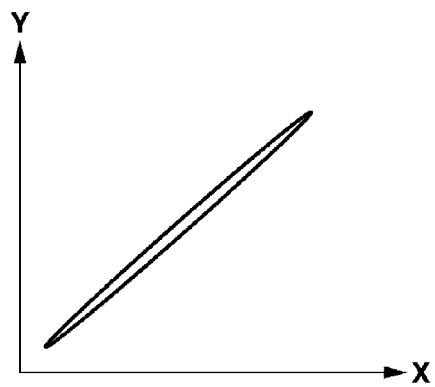
FIG. 12A is a schematic diagram illustrating a relation between noise and a two-dimensional histogram of the image.
Figure 12B:
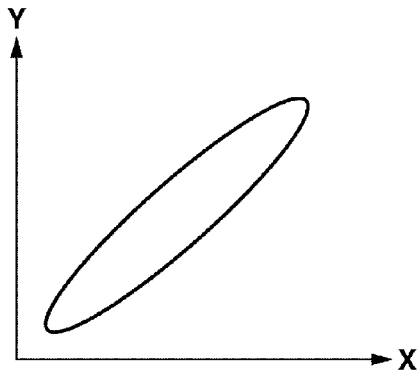
FIG. 12B is a schematic diagram illustrating a relation between noise and a two-dimensional histogram of the image.

FIG. 12A illustrates the two-dimensional histogram with respect to the gradation image illustrated in FIG. 9A, and FIG. 12B illustrates the two-dimensional histogram with respect to the gradation image including noise illustrated in FIG. 9B. X indicates the pixel value of the target pixel, and Y indicates the pixel value of the pixel that is in the predetermined positional relationship with the target pixel. Referring to FIGS. 12A and 12B, the frequencies that are not equal to 0 (i.e., the appearance distribution) are distributed within the area surrounded by the solid line.

Referring to FIG. 12A, the frequencies that are not equal to 0 are distributed in a diagonal direction. Since the pixel values of the adjacent pixels are close to each other in the gradation image, the distribution is generated near a line in which X=Y. On the other hand, the distribution is not generated in the area away from the line in which X=Y.

Referring to FIG. 12B, the frequencies that are not equal to 0 are similarly distributed in the diagonal direction. Further, the distribution exists in the region away from the line in which X=Y, due to the effect of noise. The spread distribution is generated by the combination of the pixel including the noise and the pixel not including the noise, as illustrated in FIG. 9B.

As described above, the change in the shape of the histogram due to noise generation is significant in the case of the two-dimensional histogram, which is different from the change in the shape of the histogram in the case of the one-dimensional histogram illustrated in FIGS. 10A and 10B.

The noise characteristics table which is input to a recovery tensor generation unit 356 illustrated in FIG. 3B will be described below. FIG. 4B illustrates a noise characteristic table in which the center pixel value is a combination of (30, 45). Referring to FIG. 4B, if the center pixel value (30, 45) is input, the probability that the pixel value becomes the combination of (30, 45) is 0.040. If the noise reduction process is to be performed using the two-dimensional histogram, it becomes necessary to generate the noise characteristics table as illustrated FIG. 4B for all combinations of the pixel values. As described above, if it is difficult to capture the images and acquire the noise characteristics table for all combinations of the pixel values, the noise characteristics table may be generated by performing interpolation.

The process performed in the recovery tensor generation unit 356 will be described below. When using the two-dimensional histogram, a model equation corresponding to equation (1) and illustrating a relationship between the histogram and the noise is expressed as follows.

[Math. 6]

$$p'(x, y) = \sum_i \sum_j D_{xi} D_{yj} p(i, j) \qquad (6)$$

p'(x, y) in equation (6) is the two-dimensional histogram of the input image data generated by the multidimensional histogram generation unit 354. In equation (6), x and i indicate the pixel value of the target pixel, and y and j indicate the pixel value of the pixel to the immediate right of the target pixel (i.e., the pixel in a first relational position). p(i, j) is thus the two-dimensional histogram of the image before noise generation. Further, $D_{xi}$ is the probability of the i-th pixel value becoming the x-th pixel value due to noise generation. Furthermore, $D_{yj}$ is the probability of the j-th pixel value becoming the y-th pixel value due to noise generation. Equation (6) indicates that the multidimensional histogram spreads in the X direction and the Y direction due to noise generation.

Equation (6) can be modified as described below using the pseudo inverse matrix Q of the matrix D, similarly as in the first exemplary embodiment, to express an estimate value of the two-dimensional histogram p(x, y) before noise generation.

[Math. 7]

$$\hat{p}(x, y) = \sum_i \sum_j Q_{xi} Q_{yj} p'(i, j) \qquad (7)$$

In equation (7), $Q_{xi}$ and $Q_{yj}$ are pseudo inverse matrices of $D_{xi}$ and $D_{yj}$.

A recovery tensor $R_{xi}R_{yj}$ (i.e., transform data) is also acquired using equation (8) corresponding to equation (4), in consideration of statistical noise.

[Math. 8]

$$R_{xi}R_{yj} = a(p'(i,j), N)Q_{xi}Q_{yj}b(p'(i,j), N)\delta_{xi}\delta_{yj} \qquad (8)$$

In equation (8), .delta.$_{xi}$, .delta.$_{yj}$, and .delta.$_{xk}$ are unit matrices. The transform data R for performing the noise reduction process using the one-dimensional histogram is in a matrix format. However, the transform data for performing the noise reduction process using the two-dimensional histogram is in a tensor format.

Further, the coefficients a and b are coefficients that change according to the histogram p' and the total number of pixels N in the input image data, similarly as in the case of the one-dimensional histogram. If there is a range in which the pixel values are greatly distributed and a range in which the pixel values are less distributed in the two-dimensional histogram, the following process is performed. The value of a is increased and the value of b is decreased in the range of a greater number of pixel values, to approximate the recovery tensor R to the pseudo inverse matrix Q. On the other hand, the estimate error due to the statistical noise increases in the region where the total number of pixel values (i.e., the number of samples) is small. A large value is thus set to the coefficient b and a small value to the coefficient a, so that the effect of the statistical noise becomes relatively small.

The recovery tensor acquired as described above is then stored in a recovery tensor storing buffer 357 illustrated in FIG. 3B.

A histogram recovery unit 358 then uses the recovery tensor $R_{xi}R_{yj}$ stored in the recovery tensor storing buffer 357 to acquire the recovery histogram (i.e., a recovery multidimensional histogram) employing equation (9) described below.

[Math. 9]

$$\hat{p}(x, y) = \sum_i \sum_j R_{xi} R_{yj} p'(i, j) \qquad (9)$$

The multidimensional LUT generated by a multidimensional LUT generation unit 360 is a conversion table for converting two pixel values (X', Y') to two pixel values (X, Y). The product of the noise variability characteristic distribution and the recovery histogram is calculated for each combination, and the probability distribution of the pixel values before noise generation is acquired, similarly as in the noise reduction process using the one-dimensional histogram. The weighted center position of the probability distribution of the pixel values before noise generation thus becomes an estimate value (X, Y) of the pixel value before noise generation.

Figure 13:
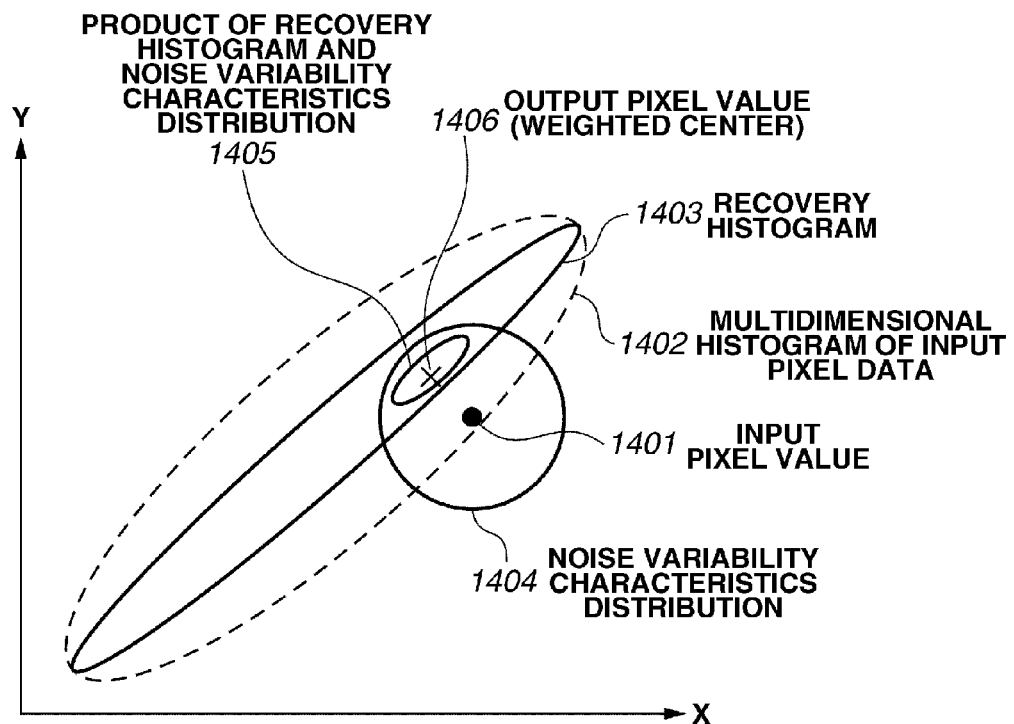
FIG. 13 illustrates the LUT generation method according to the first exemplary embodiment.

FIG. 13 illustrates the noise reduction process using the two-dimensional histogram. Referring to FIG. 13, the pixel value of the target pixel is indicated on a horizontal axis X, and the pixel value of the pixel to the immediate right of the target pixel is indicated on a vertical axis Y. Further, an axis (not illustrated) which is perpendicular with respect to a surface of the page on which FIG. 13 is illustrated indicates a frequency (or the appearance probability) of the combination of the pixel value X of the target pixel and the pixel value Y of the pixel to the immediate right of the target pixel. The frequencies which are not equal to 0 are distributed within the range surrounded by solid lines (1403 and 1404) and a broken line (1402). A recovery histogram 1403 corresponding to a two-dimensional histogram of the input image data 1402 is calculated by the histogram recovery process performed by the histogram recovery unit 358. The frequency in the recovery histogram 1403 is sharper than that in the multidimensional histogram of the input image data 1402.

Upon acquiring an input pixel value 1401, the matrix D calculates a noise variability characteristics distribution 1404. More specifically, if the input pixel value 1401 is (X', Y'), the probability that the state before noise generation is (X, Y) is expressed as $D_{XX'} D_{YY'}$. Such a probability distribution is illustrated as the noise variability characteristics distribution 1404. The product of the noise variability characteristics distribution 1404 and the recovery histogram 1403 is then calculated, so that a probability distribution of the pixel values before noise generation 1405 is acquired. A weighted center position 1406 of the probability distribution of the pixel values before noise generation 1405 is thus calculated as an output pixel value. The above-described calculations are performed for each (X', Y') in the input image data to acquire the output pixel value (X, Y) corresponding to the input pixel value, and the two-dimensional LUT is generated. The generated two-dimensional LUT is stored in a multidimensional LUT storing buffer 361 illustrated in FIG. 3B.

FIG. 7C illustrates an example of the two-dimensional LUT. Referring to FIG. 7C, a left column indicates a pair of the pixel values (X', Y') in the input image data, and a right column indicates a pair of the estimated pixel values (output pixel values (X, Y)).

A pixel value conversion unit 362 illustrated in FIG. 3B acquires the processed image (corrected image) by applying to the input image data the two-dimensional LUT in the multidimensional LUT storing buffer 361. More specifically, the pixel value conversion unit 362 scans the input image data and sequentially acquires the pair of pixel values (X', Y') of the target pixel and the pixel to the immediate right of the target pixel. The pixel value conversion unit 362 then refers to the two-dimensional LUT and acquires the corresponding output pixel value (X, Y), and the acquired output pixel value X is set as the pixel value of the target pixel.

Figure 14:
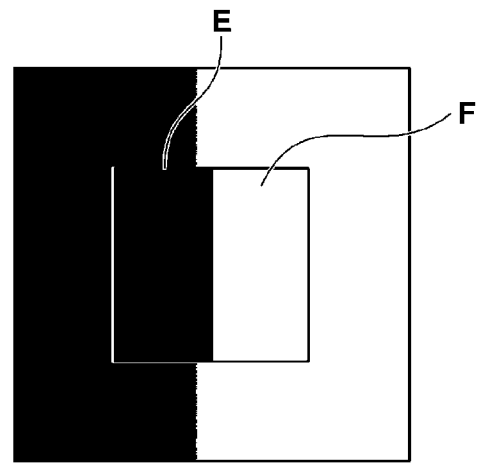
FIG. 14 illustrates an image including an edge portion in the gradation region.

The noise reduction process can be performed by the above-described process even when the input image data includes the high-frequency component, as described below. FIG. 14 illustrates an example of an image including the high-frequency component. Referring to FIG. 14, there is image data in which noise is generated in the image having an edge configured of pixels having pixel values E and F in a gradation image. In such a case, it is difficult to reduce the edge blur in the edge portion and also reduce the noise using the smoothing filter.

Figure 15:
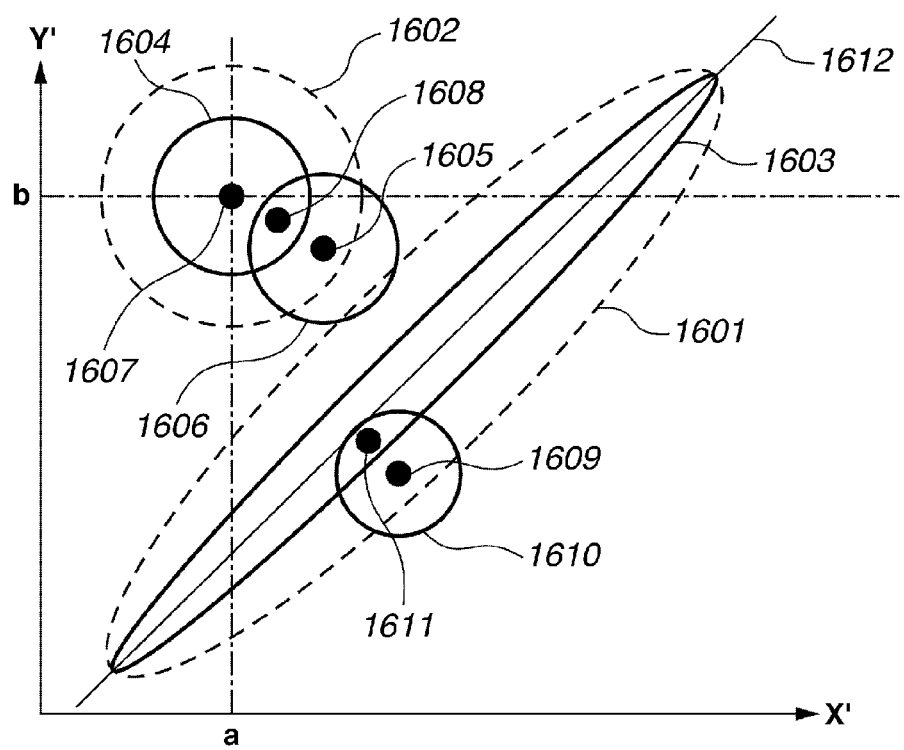
FIG. 15 illustrates the LUT generation method in the case where an image illustrated in FIG. 14 in which noise is generated is the input image.

FIG. 15 illustrates a two-dimensional histogram of the gradation image of the input image data illustrated in FIG. 14. Referring to FIG. 15, the pixel value of the target pixel is indicated on a horizontal axis X', and a pixel value of the pixel to the immediate right of the target pixel is indicated on a vertical axis Y'. The frequencies (or the frequency probabilities) which are not equal to 0 are distributed within the range surrounded by a broken line. As illustrated in FIG. 15, the histogram of the image in which noise is generated in the image including gradation and the edge is mainly distributed in two regions. More specifically, combinations of pixel values belonging to a gradation region and a flat region correspond to a region 1601, and combinations of the pixel values in the edge portion correspond to a region 1602.

A combination 1605 is a combination of pixel values near the edge portion in which noise is generated. A recovery histogram 1603 corresponding to the two-dimensional histogram 1601 is generated by performing the recovery histogram process. Similarly, a recovery histogram 1604 corresponding to the two-dimensional histogram 1602 is generated by performing the recovery histogram process. The frequencies (or the frequency probabilities) which are not equal to 0 are distributed within the region surrounded by the solid lines of the recovery histograms 1604 and 1605. A product of a noise variability characteristics distribution 1606 corresponding to the combination of pixels 1605 and the recovery histogram is then calculated. As a result, the probability distribution of the pixel values before noise generation is acquired. An output pixel value 1608 is thus acquired by calculating the weighted center position of the probability distribution of the pixel values before noise generation.

As described above, the pixel value 1605 is the combination of the pixels near the edge portion in which noise is generated. According to the present exemplary embodiment, such a combination is converted to the output pixel value 1608 by performing noise reduction. The combination of the pixel values of high contrast in the multidimensional histogram is disposed in an upper left portion or a lower right portion illustrated in FIG. 15. Since the combination of the input pixel values 1605 near the edge portion including noise has shifted in the upper left direction by performing the noise reduction process according to the present exemplary embodiment, the contrast has improved instead of being lowered. Further, the input pixel value 1605 has become closer to the pixel value 1607 before noise generation by performing the noise reduction process according to the present exemplary embodiment. The noise is thus also reduced. According to the above-described exemplary embodiment, the noise can be reduced even when the input image data includes a high-frequency component.

On the other hand, a combination of pixel values 1609 belonging to the gradation portion that mainly includes low to middle-frequency components is transformed to a combination of pixel values 1611. The combination of pixel values 1611 is the weighted center position of a product of the recovery histogram and a noise variability characteristics distribution 1610 corresponding to the combination of pixel values 1609. If a difference between the pixel values in the gradation portion of the target pixel and the pixel to the immediate right of the target pixel is defined as C, and the horizontal axis as X and the vertical axis as Y in FIG. 15, a central axis 1612 of a region of the multidimensional histogram 1601 can be expressed as a line $Y=X+C$. The frequencies which are not equal to 0 are distributed near the central axis 1612. The region 1601 is converted to the region 1603 that is closer to the central axis 1612 as a result of performing histogram recovery. The combination of the pixel values 1611 after shifting is thus closer to the central axis 1612 as compared to the combination 1609, and closer to the line $Y=X+C$, i.e., the state before noise generation. In other words, since the noise is reduced in the combination 1611 as compared to the combination of the input pixel values 1609, the noise is also reduced with respect to the gradation portion.

As described above, according to the present exemplary embodiment, the noise is reduced in the edge portion, i.e., the high-frequency component of the input image, and in the gradation portion, i.e., the low to middle-frequency components of the input image. The present invention can thus reduce the noise regardless of the spatial frequency of the input image. As a result, according to the present exemplary embodiment, the noise can be reduced while maintaining the fine texture component and the edge component of the object image.

According to the present exemplary embodiment, the two-dimensional histogram is described as an example of the multidimensional histogram used in performing the noise reduction process. Further, according to the present exemplary embodiment, if the target pixel positioned at a right end of the image is to be corrected, the pixel value of the pixel to the immediate right of the target pixel cannot be acquired. In such a case, the histogram is generated by assuming that there is a pixel to the immediate right of the target pixel having the same pixel value as the target pixel, or the correction process is not performed on the target pixel positioned at the edge of the image. If the input image is captured by a sensor employing a Bayer array, a color of the pixel to the immediate right of the target pixel may not be the same color as the target pixel. The present exemplary embodiment may thus be applied for each color if the pixel in the input image corresponds to one of a plurality of colors.

Furthermore, if the present exemplary embodiment is to be applied to noise reduction in an image acquired by thinning out and reducing the input image, it is desirable to apply the present exemplary embodiment to the pixels that have not been thinned out. Moreover, if odd number columns and even number columns in the input image are to be separately processed by different image processing apparatuses, the present exemplary embodiment may be applied to the image including only the odd number rows or only the even number rows in the calculation device.

Further, the image may be divided into regions, and the noise reduction process according to the present exemplary embodiment may be applied to each region. Such regions are collections of the pixels separated according to color, a position of the input pixel, or an input pixel value. If the pixels are to be separated according to color, the regions can be separated by a red (R) value, a blue (B) value, and a green (G) value, or by a brightness value and a color difference value. If the pixels are to be separated according to the position of the input pixel, the pixels may be separated by blocks of a predetermined size (i.e., a mesh), or by employing an image determination technique (e.g., face recognition). The results of the noise reduction process for each region are then combined, so that the finalized corrected image is acquired. Furthermore, the finalized corrected image may be acquired by combining the region in which noise reduction is performed and the region in which noise reduction is not performed.

According to the present exemplary embodiment, when the two-dimensional histogram is generated, the pixel value of the target pixel and the pixel value of the pixel to the immediate right of the target pixel are used. However, this is not a limitation, and, for example, the pixel to the immediate left of the target pixel, or the pixel to the second right of the target pixel may be used. Further, the noise reduction process may be performed based on a histogram that is three-dimensional or more. For example, the multidimensional histogram may be generated by a combination of the pixel values of the target pixel, the pixel to the immediate right of the target pixel, and a pixel immediately below the target pixel, in the input image data.

The feature of the present exemplary embodiment with respect to the relationship between the input image and the output image after performing the noise reduction process is that the value of the output pixel is determined based on the pair of a pixel value and a pixel value adjacent thereto in the input image. Further, the value of the output pixel is determined by causing the pair of the input pixel values to become closer to the pair of pixel values of higher frequency in the two-dimensional histogram of the input image. Since the peak of the input histogram becomes sharp by performing histogram recovery, the pairs of the pixel values near the peak are transformed to become closer to the peak.

The noise reduction process according to the first exemplary embodiment scans the input image and acquires, using the LUT illustrated in FIG. 7C, the combination of the estimate values of the pixel values before noise generation with respect to the combination of the pixel values of the input image data (X', Y'). The pixel value conversion unit 362 then refers to the LUT and converts the pixel value of the focus image X' to the estimate value X.

According to a second exemplary embodiment of the present invention, when the pixel value conversion unit 362 assigns a pixel to one pixel, at least two combinations of the pixel values are used.

Figure 16:
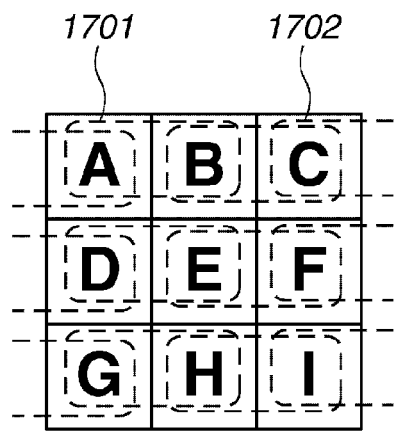
FIG. 16 is a schematic diagram illustrating assignment of pixel values.

FIG. 16 is a schematic diagram illustrating a combinations of pixels used when the pixel value conversion unit 362 assigns a pixel value W. Referring to FIG. 16, A, B, C, D, E, F, G, H, and I indicate pixels in the input image data.

If pixel A is the target pixel, the noise reduction process according to the first exemplary embodiment is performed based on a pixel value $X_A'$ of pixel A, and a pixel value $Y_B'$ of pixel B. Estimated values $X_A$ and YB of the pixel values before noise generation are then acquired. Similarly, if pixel B is the target pixel, estimated values $X_B$ and $Y_C$ of the pixel values before noise generation are acquired based on a pixel value $X_B'$ of the pixel B and a pixel value $Y_C'$ of pixel C.

According to the present exemplary embodiment, the pixel value conversion unit 362 assigns an estimate value $W_B$ of the pixel value after noise reduction with respect to pixel B by employing the following equation (10).
[Math. 10]

$$W_B = (Y_B + X_B)/2 \qquad (10)$$

More specifically, according to the first exemplary embodiment, the estimated value $X_B$ is assigned to pixel B. On the other hand, according to the present exemplary embodiment, the average value $W_B$ of the estimate values ($Y_B$ and $X_B$) of pixel B estimated for each of the two combinations (1701 and 1702) is assigned to pixel B.

The pixel value conversion unit 362 also assigns the estimate value W of the pixel values after noise reduction to the other pixels, similarly using the equation (10).

Figure 17:
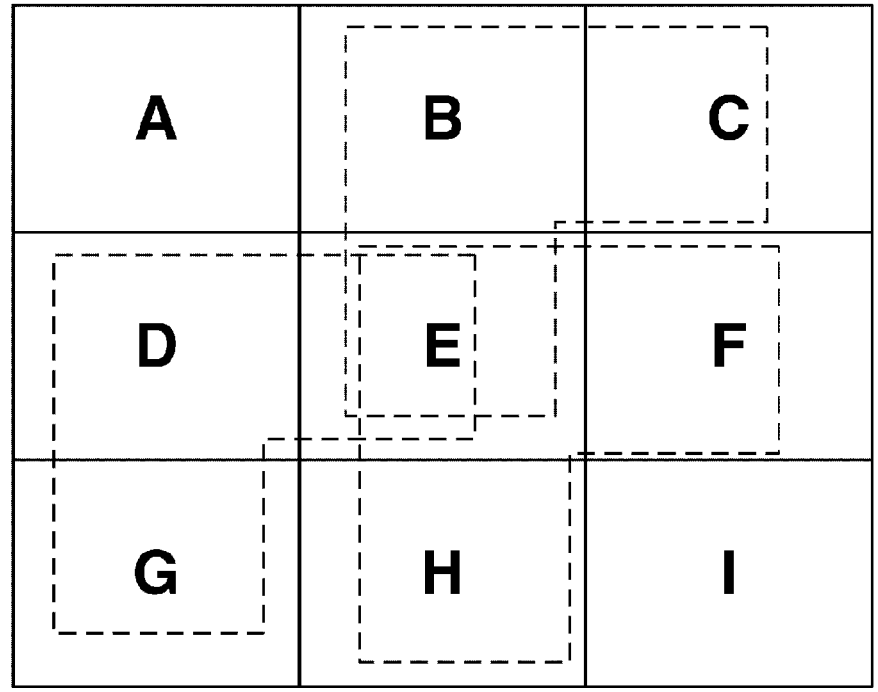
FIG. 17 is a schematic diagram illustrating assignment of pixel values using a plurality of combinations.

FIG. 17 is a schematic diagram illustrating an assigning process when the noise reduction process is performed using a three-dimensional histogram. Referring to FIG. 17, when an estimate value $W_E$ of the pixel value after noise reduction is to be assigned to pixel E, estimate values of the combinations of the pixel values described below are used.

(a) An estimate pixel value $V_1$ of the pixel E based on a combination of pixels B, C, and E.

(b) An estimate pixel value $V_2$ of the pixel E based on a combination of pixels D, E, and G.

(c) An estimate pixel value $V_3$ of the pixel E based on a combination of pixels E, F, and H.

$W_E$ is then acquired using $V_1$, $V_2$, and $V_3$ in the following equation.
[Math. 11]

$$W_E = (V_1 + V_2 + V_3)/3 \qquad (11)$$

As described above, according to the present exemplary embodiment, the estimation accuracy of the image before noise generation can be improved by using a plurality of information.

Further, if it is not desirable to greatly change the input image data, the estimate pixel value among $V_1$, $V_2$, and $V_3$ which is closest to the pixel value of the pixel E in the input image may be assigned to reduce the effect of noise reduction. In other words, the estimate pixel value in which there is little change by performing correction may be assigned. The image after noise reduction can thus have the desired characteristic as a result of changing the methods for assigning the pixel value.

Furthermore, according to the exemplary embodiment, a direct current (DC) component of the image may not be maintained. If the combination of the pixel values of the input image is (X', Y'), and the combination of the estimate values of the pixel values before noise generation is (X, Y), (X'+Y')/2 does not necessarily equal (X+Y)/2. The LUT may thus be corrected so that the average value can be maintained. Estimate values before noise generation when the LUT is corrected to maintain the DC component are defined as (X2, Y2). (X2, Y2) can then be calculated as follows.

$$X2 = X - (X - X' + Y - Y')/2$$

$$Y2 = Y - (X - X' + Y - Y')/2$$

According to the above-described equations, (X2+Y2)/2=(X+Y)/2, so that the DC component is maintained.

According to a third exemplary embodiment of the present invention, the image indicated by the input image data is divided into image regions as described in the first exemplary embodiment. The LUT is then generated for each of the divided image region, and the pixel value conversion unit 362 converts the pixel value. According to the present exemplary embodiment, if the number of divided regions is D, the number of generated LUTs is also D. According to the first exemplary embodiment, when the multidimensional histogram is calculated, the edge portion and the flat portion are collectively counted.

Figure 18:
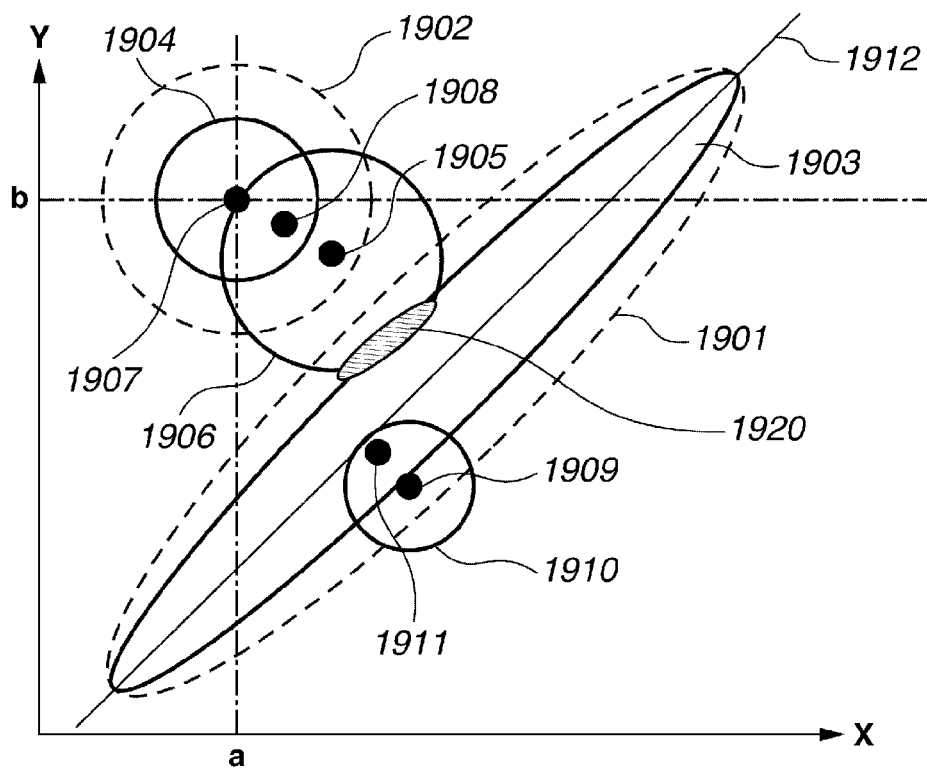
FIG. 18 illustrates the LUT generation method according to a third exemplary embodiment of the present invention.

FIG. 18 illustrates a noise reduction process using the two-dimensional histogram, and corresponds to the example illustrated in FIG. 15 in the case where an amount of noise is large (i.e., the dispersion of the noise variability characteristics distribution 801 is large). If there is a large amount of noise, a noise variability characteristics distribution 1906 of a combination of the pixel values 1905 in the edge portion of the input image data overlaps with a smooth region 1903 of the recovery histogram. An overlap 1920 is thus generated. As a result, a point 1905 is corrected towards an opposite direction of approaching a point 1907 before noise generation, and is thus obstructed from approaching the point 1907. Such a problem occurs due to the edge portion and the smooth portion being collectively reflected to the multidimensional histogram.

If the image indicated by the input image data is previously divided into regions, the frequency of the recovery histogram region 1903 becomes small or 0 by performing the noise reduction process on the edge portion. In such a case, there is no or small influence of the overlap 1920 on the correction of the point 1905, so that the point 1905 becomes closer to the point 1907 that is the ideal correction result.

As described above, according to the present exemplary embodiment, the image is previously divided into regions that are close in statistical characteristics (i.e., distribution characteristics of the multidimensional histogram). The LUT is then generated for and applied to each region. It is desirable for the regions to be divided based on whether the region is the edge region in the image indicated by the input image data.

As described above, more appropriate noise reduction can be realized by performing noise reduction for each region.

Histogram recovery is performed by estimating the histogram before noise generation from the histogram after noise generation. According to the first exemplary embodiment, the histogram recovery is performed using the pseudo inverse matrix of the noise characteristics. According to a fourth exemplary embodiment of the present invention, the histogram recovery according to the first exemplary embodiment is simplified. Since the histogram is sharpened by performing the histogram recovery, it can be assumed that sharpening using a filtering process performed in a histogram space can substitute the recovery performed using the pseudo inverse matrix.

In the case of recovering the one-dimensional histogram, the histogram can be sharpened by performing a convolution operation on a (−1 3 −1) filter that enhances the high-frequency and the histogram. In the case of the two-dimensional histogram, the (−1 3 −1) filter is applied in the X-axis direction, and then to the Y-axis direction, so that the two-dimensional histogram is sharpened. If the high-frequency enhancement filter is sequentially applied to each axis for the multidimensional histograms in general, the histograms are sharpened.

Sharpening filters other than the (−1 3 −1) filter may also be used. If there is a large amount of noise, the blur of the histogram becomes large, so that it is preferable to apply a strong high-frequency enhancement filter. Further, since the amount of noise is larger in a bright portion as compared to a dark portion, it is desirable to switch the filters. In other words, it is desirable to apply a comparatively weak high-frequency enhancement filter to the dark portion of the histogram, and a comparatively strong high-frequency enhancement filter to the bright portion. Furthermore, the reliability of the histogram changes according to the size of the total number of pixels, so that it is desirable to change the level of sharpness according to the total number of pixels.

Figure 21:
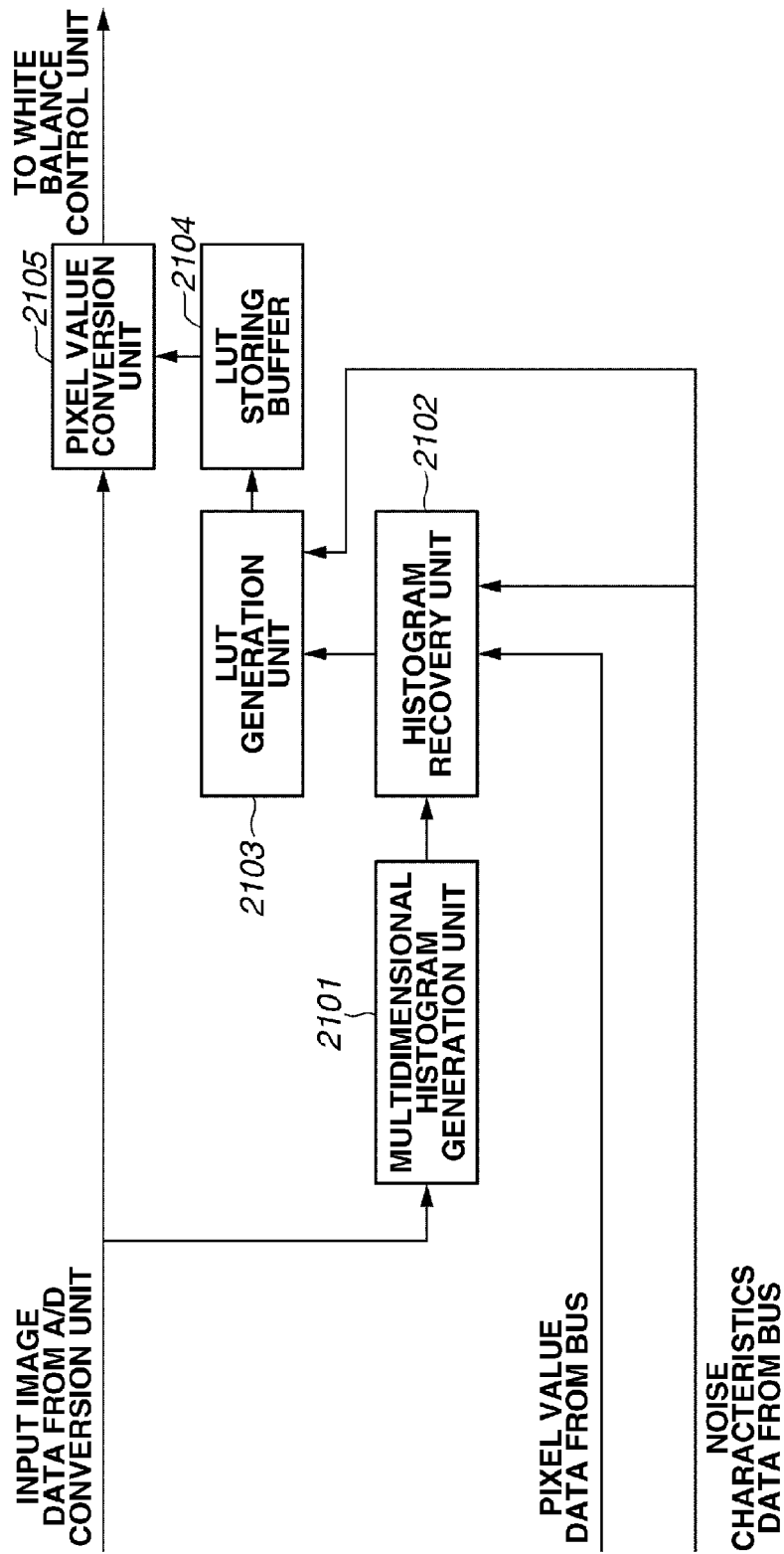
FIG. 21 is a block diagram illustrating noise reduction according to a fourth exemplary embodiment of the present invention.
Figure 22A:
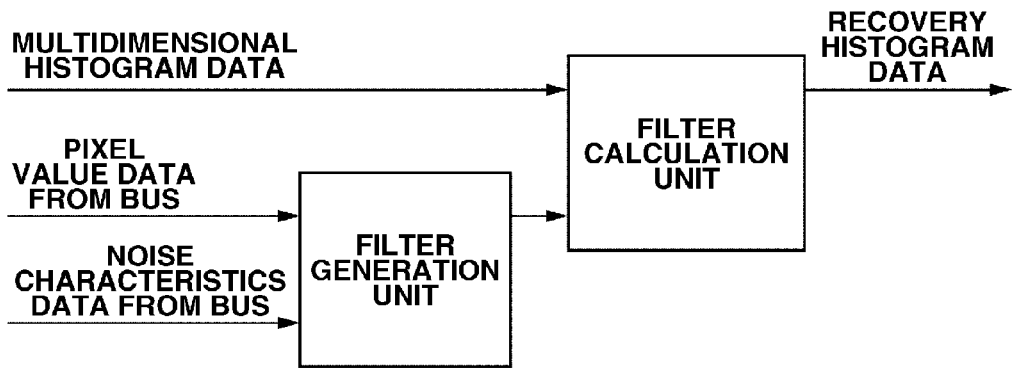
FIG. 22A is a block diagram illustrating a histogram recovery unit.

FIG. 21 illustrates a block diagram for realizing the above-described process. Referring to FIG. 21, the recovery tensor generation unit and the storing buffer are not included, unlike the first exemplary embodiment. Since the histogram recovery is performed by edge enhancement on the histogram, it is not necessary to generate and store the tensor. FIG. 22A illustrates in detail the histogram recovery unit. Referring to FIG. 22A, a filter generation unit acquires the data of the total number of pixels and the noise characteristics data via a bus, and configures the sharpening filter based on the acquired data. A filter operation unit performs convolution operation on the multidimensional histogram data and the sharpening filter, and outputs the sharpened histogram data (i.e. the recovery histogram).

As described above, according to the present exemplary embodiment, filter processing for enhancing the high-frequency component is performed based on the noise characteristics data and the total number of pixels in the input image data, to sharpen the input multidimensional histogram. As a result, a processing load becomes small according to the present exemplary embodiment as compared to that in the first exemplary embodiment in which it is necessary to perform the pseudo inverse matrix operation.

A fifth exemplary embodiment according to the present invention is similar to the fourth exemplary embodiment except for the process performed in the histogram recovery unit. Histogram recovery is performed by estimating the histogram before noise generation from the histogram after noise generation. According to the first exemplary embodiment, the histogram recovery is performed using the pseudo inverse matrix of the noise characteristics. According to a fifth exemplary embodiment of the present invention, the histogram recovery according to the second exemplary embodiment is simplified. Since the histogram is sharpened by performing the histogram recovery, the histogram is transformed using a function according to the present exemplary embodiment to sharpen the histogram.

Figure 19A:
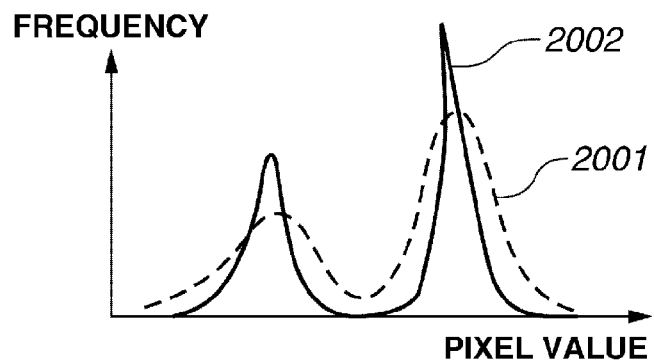
FIG. 19A illustrates histogram recovery according to a fifth exemplary embodiment of the present invention.
Figure 19B:
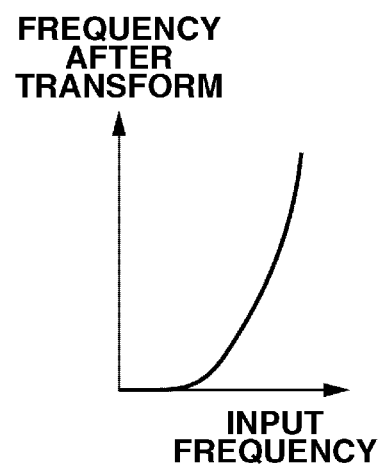
FIG. 19B illustrates histogram recovery according to the fifth exemplary embodiment of the present invention.

If gamma processing such as a quadratic function as illustrated in FIG. 19B is applied to a histogram 2001 illustrated in FIG. 19A, a sharpened histogram such as a histogram 2002 illustrated in FIG. 19A is acquired. Gamma processing illustrated in FIG. 19B further decreases the frequencies of the pixel values whose frequencies are small, and further increases the frequencies of the pixel values whose frequencies are large. The transformation of the frequencies by applying such a function thus sharpens the histogram. Further, since the degree of the blur in the histogram depends on the amount of noise, it is desirable to apply different gamma processing to the portions in the input histogram where the pixel values are large and small to change the degree of sharpness. Furthermore, since the reliability of the histogram changes according to the total number of pixels, it is desirable to adjust gamma processing to be applied according to the total number of pixels.

Figure 22B:
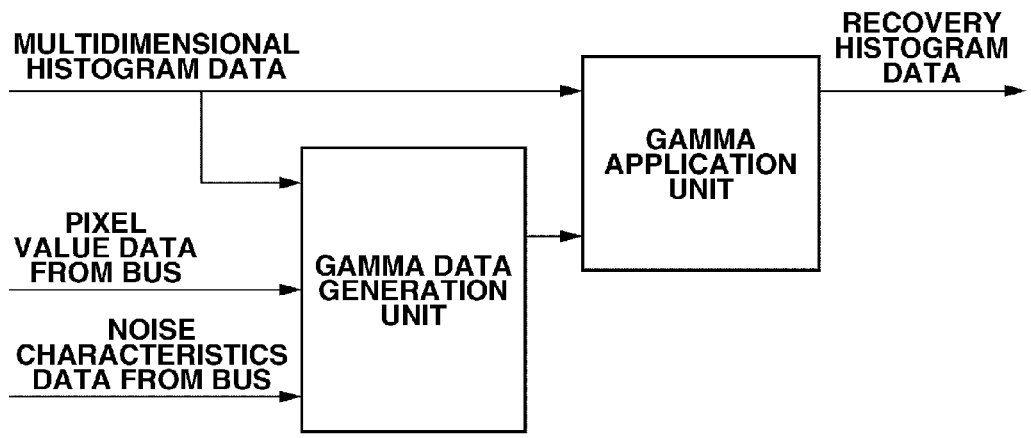
FIG. 22B is a block diagram illustrating a histogram recovery unit.

The above-described process can be realized by configuring the histogram recovery unit illustrated in FIG. 21 using a block diagram illustrated in FIG. 22b. Referring to FIG. 22B, a gamma data generation unit acquires the data of the total number of pixels and the noise characteristics data via a bus, and configures gamma data based on the acquired data. A gamma application unit applies the gamma data to the multidimensional histogram data, and outputs the sharpened histogram data (i.e. the recovery histogram).

As described above, according to the present exemplary embodiment, gamma processing is performed based on the noise characteristics data and the total number of pixels in the input image data, to sharpen the input multidimensional histogram. As a result, the processing load becomes small according to the present exemplary embodiment as compared to that in the first exemplary embodiment in which it is necessary to perform the pseudo inverse matrix operation.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-158131 filed Jul. 12, 2010, which is hereby incorporated by reference herein in its entirety.

The invention claimed is:

1. An image processing apparatus comprising:
an input unit configured to receive input image data captured by an imaging unit;
a first generation unit configured to generate an input histogram of the input image data based on the input image data; and
a correction unit configured to change a characteristic value of the input image data to a statistical value of an overlapped region of (a) a distribution of the input histogram and (b) a distribution of noise characteristics data corresponding to the characteristic value.

2. The image processing apparatus according to claim 1, wherein the characteristic value is a pixel value.

3. The image processing apparatus according to claim 1, wherein the characteristic value is a value determined by a combination of a first pixel value of a first pixel and a second pixel value of a second pixel that is in a first positional relationship with the first pixel.

4. The image processing apparatus according to claim 3, wherein the correction unit includes:
   a determination unit configured to determine, based on noise characteristics data attributable to the imaging unit and the input histogram, a third pixel value corresponding to the first pixel value in the combination, and a fourth pixel value corresponding to the second pixel value in the combination; and
   a second generation unit configured to generate a fifth pixel value based on the third pixel value and the fourth pixel value.

5. The image processing apparatus according to claim 1, wherein the input histogram is a histogram indicating a frequency of a combination of a sixth pixel value of each target pixel in an image represented by the input data and a seventh pixel value of a pixel that is in the first positional relationship with the target pixel.

6. The image processing apparatus according to claim 1, further comprising a transform data generation unit configured to transform, based on the noise characteristics data, the input histogram to a recovery histogram that is a histogram in which noise in the input image data is reduced,
   wherein the correction unit corrects the input image data based on the noise characteristics data and the recovery histogram.

7. The image processing apparatus according to claim 1, further comprising a dividing unit configured to divide an image represented by the input image data to a plurality of image regions,
   wherein the first generation unit generates the input histogram for each of the image regions, and
   wherein the correction unit corrects the input image data for each of the image regions.

8. The image processing apparatus according to claim 7, wherein the dividing unit divides an image represented by the input image data to a plurality of image regions based on whether a region is an edge region.

9. The image processing apparatus according to claim 6, wherein the transform data generation unit transforms the input histogram to the recovery histogram based on filter processing that enhances high frequencies.

10. The image processing apparatus according to claim 6, wherein the transform data generation unit transforms the input histogram to the recovery histogram based on gamma processing.

11. An image processing method comprising:
    receiving input image data captured by an imaging unit;
    generating an input histogram of the input image data based on the input image data; and
    changing a characteristic value of the input image data to a statistical value of an overlapped region of (a) a distribution of the input histogram and (b) a distribution of noise characteristic data corresponding to the characteristic value.

12. An image processing apparatus comprising
    an input unit configured to receive input image data captured by an imaging unit;
    a first generation unit configured to generate a distribution derived by dividing numbers of each characteristic value of the input image data by a number of the whole characteristic value of the input image data; and
    a correction unit configured to change a characteristic value of the input image data to a statistical value of an overlapped region of (a) a distribution of the input histogram and (b) a distribution of noise characteristics data corresponding to the characteristic value.

13. An image processing method comprising:
    receiving input image data captured by an imaging unit;
    generating a distribution derived by dividing numbers of each characteristic value of the input image data by a number of the whole characteristic value of the input image data; and
    changing a characteristic value of the input image data to a statistical value of an overlapped region of (a) a distribution of the input histogram and (b) a distribution of noise characteristics data corresponding to the characteristic value.

* * * * *